(12) United States Patent
Olinger et al.

(10) Patent No.: US 11,468,908 B2
(45) Date of Patent: Oct. 11, 2022

(54) HYBRID INPUT MACHINE LEARNING FRAMEWORKS

(71) Applicant: Optum, Inc., Minnetonka, MN (US)

(72) Inventors: Randy Olinger, Edina, MN (US); Damian Kelly, Kildare (IE); Megan O'Brien, Kildare (IE)

(73) Assignee: Optum, Inc., Minnetonka, MN (US)

( * ) Notice: Subject to any disclaimer, the term of this patent is extended or adjusted under 35 U.S.C. 154(b) by 18 days.

(21) Appl. No.: 17/073,638

(22) Filed: Oct. 19, 2020

(65) Prior Publication Data

US 2021/0327455 A1     Oct. 21, 2021

Related U.S. Application Data

(60) Provisional application No. 63/010,177, filed on Apr. 15, 2020, provisional application No. 63/024,046, filed on May 13, 2020.

(51) Int. Cl.
*H04R 29/00* (2006.01)
*G10L 25/27* (2013.01)
(Continued)

(52) U.S. Cl.
CPC .............. *G10L 25/27* (2013.01); *G06N 20/00* (2019.01); *G10L 25/18* (2013.01); *G10L 25/51* (2013.01)

(58) Field of Classification Search
CPC ..................................................... H04R 29/00
See application file for complete search history.

(56) References Cited

U.S. PATENT DOCUMENTS 9,591,427 B1 * 3/2017 Lyren ..................... G06F 3/013
10,028,675 B2   7/2018 Patel et al.
(Continued)

FOREIGN PATENT DOCUMENTS

| CN | 109431507 A | 3/2019 |
| WO | 2019/119050 A1 | 6/2019 |
| WO | 2020/046398 A1 | 3/2020 |

OTHER PUBLICATIONS

Amoh, Justice et al. "Deep Neural Networks for Identifying Cough Sounds," In IEEE Transactions on Biomedical Circuits and Systems, vol. 10, Issue 5, Oct. 2016. DOI: 10.1109/TBCAS.2016.2598794.

(Continued)

*Primary Examiner* — Olisa Anwah
(74) *Attorney, Agent, or Firm* — Alston & Bird LLP

(57) ABSTRACT

There is a need for more accurate and more efficient hybrid-input prediction steps/operations. This need can be addressed by, for example, techniques for efficient joint processing of data objects. In one example, a method includes: processing an audio data object using an audio processing machine learning model to generate an audio-based feature data object, processing an acceleration data (Continued)

object using an acceleration processing machine learning model to generate an acceleration-based feature data object, processing the audio-based feature data object and the acceleration-based feature data object using an feature synthesis machine learning model in order to generate a hybrid-input prediction data object; and performing one or more prediction-based actions based at least in part on the hybrid-input prediction data object.

20 Claims, 14 Drawing Sheets

(51) Int. Cl.
*G10L 25/18* (2013.01)
*G10L 25/51* (2013.01)
*G06N 20/00* (2019.01)

(56) References Cited

U.S. PATENT DOCUMENTS

| | | | |
|---|---|---|---|
| 10,096,319 | B1 | 10/2018 | Jin et al. |
| 10,098,569 | B2 | 10/2018 | Abeyratne et al. |
| 11,298,072 | B2* | 4/2022 | Dascalu .............. A61B 5/7415 |
| 2008/0312547 | A1 | 12/2008 | Wada |
| 2016/0089089 | A1 | 3/2016 | Kakkar et al. |
| 2017/0325717 | A1 | 11/2017 | Dellimore et al. |
| 2018/0206764 | A1 | 7/2018 | Ozawa et al. |
| 2018/0254041 | A1 | 9/2018 | Harper |
| 2018/0296092 | A1 | 10/2018 | Hassan et al. |
| 2019/0108841 | A1 | 4/2019 | Vergyri et al. |
| 2019/0279481 | A1 | 9/2019 | Silberschatz et al. |
| 2019/0341151 | A1 | 11/2019 | Hamada et al. |
| 2020/0035261 | A1 | 1/2020 | Mitchell et al. |
| 2020/0075136 | A1 | 3/2020 | Harper et al. |
| 2020/0098384 | A1 | 3/2020 | Nematihosseinabadi et al. |
| 2021/0345939 | A1* | 11/2021 | Jumbe .................. H04R 1/46 |
| 2022/0007965 | A1* | 1/2022 | Tiron .................. A61B 5/6898 |
| 2022/0148713 | A1* | 5/2022 | Gordon ................ G16H 50/20 |

OTHER PUBLICATIONS

Kvapilova, Lucia et al. "Continuous Sound Collection Using Smartphones and Machine Learning To Measure Cough," Digital Biomarkers, (2019), vol. 3, No. 3, pp. 166-175.

Liu, Jia-Ming et al. "Cough Event Classification By Pretrained Deep Neural Network," BMC Medical Informatics and Decision Making, Nov. 2015, vol. 15, Suppl. 4:S2, pp. 1-10, Belfast, UK.

Majumder, Sumit et al. "Smartphone Sensors For Health Monitoring and Diagnosis," Sensors, vol. 19, No. 2164, (2019), pp. 1-45. DOI: 10.3390/s19092164.

Mehta, Ivan. "Amazon's New Patent Will Allow Alexa To Detect A Cough Or A Cold," Artificial Intelligence, Oct. 15, 2018, (3 pages), (Article, Online). [Retrieved from the Internet Mar. 23, 2020] <URL: https://web.archive.org/web/20190205023109/https://thenextweb.com/artificial-intelligence/2018/10/15/amazons-new-patent-will-allow-alexa-to-detect-your-illness/>.

Ms. Smith. "Amazon Patent Gives Alexa Ability To Detect Illness, 'Emotional Abnormality'," CSO Online, Oct. 15, 2018, (4 pages), (Article, Online). [Retrieved from the Internet Mar. 23, 2020] <URL: https://web.archive.org/web/20190409072709/https://www.csoonline.com/article/3313422/amazon-patent-gives-alexa-ability-to-detect-illness-emotional-abnormality.html>.

Quach, Katyanna. "Thankfully, Our AI Savior Is Here To Nail The COVID-19 Pandemic: A Neural Network That Can Detect Coughing," The Register, Mar. 20, 2020, (5 pages). [Retrieved from the Internet Jan. 2, 2021] <URL: https://www.theregister.com/2020/03/20/coronavirus_ai_cough/>.

Sunshine, Jacob et al. "Alexa, Do I Have Coronavirus?," The New York Times, Apr. 5, 2020, (2 pages), (Article, Online). [Retrieved from the Internet Jan. 2, 2021] <URL: https://www.nytimes.com/2020/04/05/opinion/coronavirus-testing-smart-home.html>.

* cited by examiner

HYBRID INPUT MACHINE LEARNING FRAMEWORKS

CROSS-REFERENCE TO RELATED APPLICATIONS

The present application claims priority to and the benefit of U.S. Provisional Patent Application No. 63/010,177, filed on Apr. 15, 2020 and U.S. Provisional Patent Application No. 63/024,046, filed on May 13, 2020, each of which is incorporated by reference herein in its entirety.

BACKGROUND

Various embodiments of the present invention address technical challenges related to generating hybrid-input prediction data objects by joint processing of multiple data objects having different formats (e.g., different sensory formats, different sampling formats, and/or the like) and disclose innovative techniques for improving efficiency and/or reliability of hybrid-input prediction systems.

BRIEF SUMMARY

In general, embodiments of the present invention provide methods, apparatuses, systems, computing devices, computing entities, and/or the like for performing hybrid-input prediction steps/operations that require processing data contained in multiple data objects. Various embodiments of the present invention disclose techniques for consolidating (e.g., combining, merging and/or the like) data from two or more unrelated data objects and generating hybrid-input prediction data objects.

In accordance with one aspect, a method for joint processing of an audio data object and an acceleration data object is provided. In one embodiment, the method comprises processing the audio data object using an audio processing machine learning model to generate an audio-based feature data object, wherein: the audio processing machine learning model comprises: (i) an audio model fast Fourier transform (FFT) layer that is configured to process the audio data object in order to generate an audio model FFT output and (ii) an audio model one-dimensional convolutional layer that is configured to process the audio model FFT output to generate an audio model convolutional output, and the audio-based feature data object is generated based at least in part on the audio model convolutional output; processing the acceleration data object using an acceleration processing machine learning model to generate an acceleration-based feature data object, wherein: the acceleration processing machine learning model comprises: (i) an acceleration model FFT layer that is configured to process the acceleration data object to generate an acceleration model FFT output, (ii) an acceleration model one-dimensional convolutional layer that is configured to process the acceleration model FFT output to generate an acceleration model convolutional output, and (iii) an acceleration model up-sampling layer that is configured to process the acceleration model convolutional output to generate an acceleration model up-sampling output, and the acceleration-based feature data object is generated based at least in part on the acceleration model up-sampling output; processing the audio-based feature data object and the acceleration-based feature data object using an feature synthesis machine learning model in order to generate a hybrid-input prediction data object; and performing one or more prediction-based actions based at least in part on the hybrid-input prediction data object.

In accordance with another aspect, an apparatus for joint processing of an audio data object and an acceleration data object is provided, the apparatus comprising at least one processor and at least one memory including program code, the at least one memory and the program code configured to, with the processor, cause the apparatus to at least: process the audio data object using an audio processing machine learning model to generate an audio-based feature data object, wherein: the audio processing machine learning model comprises: (i) an audio model fast Fourier transform (FFT) layer that is configured to process the audio data object in order to generate an audio model FFT output and (ii) an audio model one-dimensional convolutional layer that is configured to process the audio model FFT output to generate an audio model convolutional output, and the audio-based feature data object is generated based at least in part on the audio model convolutional output; process the acceleration data object using an acceleration processing machine learning model to generate an acceleration-based feature data object, wherein: the acceleration processing machine learning model comprises: (i) an acceleration model FFT layer that is configured to process the acceleration data object to generate an acceleration model FFT output, (ii) an acceleration model one-dimensional convolutional layer that is configured to process the acceleration model FFT output to generate an acceleration model convolutional output, and (iii) an acceleration model up-sampling layer that is configured to process the acceleration model convolutional output to generate an acceleration model up-sampling output, and the acceleration-based feature data object is generated based at least in part on the acceleration model up-sampling output; process the audio-based feature data object and the acceleration-based feature data object using a feature synthesis machine learning model in order to generate a hybrid-input prediction data object; and perform one or more prediction-based actions based at least in part on the hybrid-input prediction data object.

In accordance with yet another aspect, a computer program product for joint processing of an audio data object and an acceleration data object is provided, the computer program product comprising at least one non-transitory computer-readable storage medium having computer-readable program code portions stored therein, the computer-readable program code portions configured to: process the audio data object using an audio processing machine learning model to generate an audio-based feature data object, wherein: the audio processing machine learning model comprises: (i) an audio model fast Fourier transform (FFT) layer that is configured to process the audio data object in order to generate an audio model FFT output and (ii) an audio model one-dimensional convolutional layer that is configured to process the audio model FFT output to generate an audio model convolutional output, and the audio-based feature data object is generated based at least in part on the audio model convolutional output; process the acceleration data object using an acceleration processing machine learning model to generate an acceleration-based feature data object, wherein: the acceleration processing machine learning model comprises: (i) an acceleration model FFT layer that is configured to process the acceleration data object to generate an acceleration model FFT output, (ii) an acceleration model one-dimensional convolutional layer that is configured to process the acceleration model FFT output to generate an acceleration model convolutional output, and (iii) an acceleration model up-sampling layer that is configured to process the acceleration model convolutional output to generate an acceleration model up-sampling output, and the acceleration-based feature data object is generated based at least in part on the acceleration model up-sampling output; process the audio-based feature data object and the acceleration-based feature data object using a feature synthesis machine learning model in order to generate a hybrid-input prediction data object; and perform one or more prediction-based actions based at least in part on the hybrid-input prediction data object.

BRIEF DESCRIPTION OF THE DRAWINGS

Figure 1:
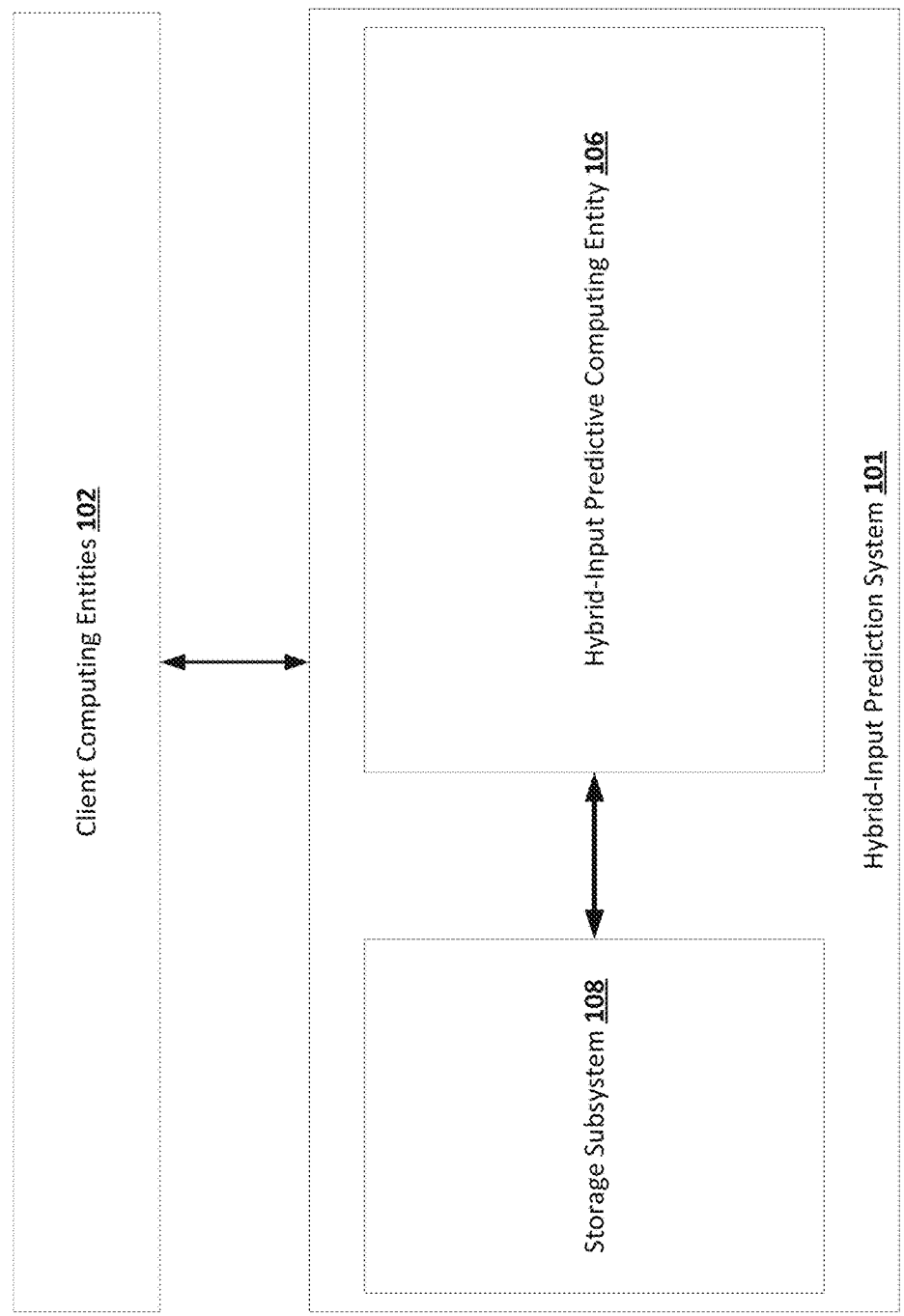

Having thus described the invention in general terms, reference will now be made to the accompanying drawings, which are not necessarily drawn to scale, and wherein:

FIG. 1 provides an exemplary overview of a system architecture that can be used to practice embodiments of the present invention.

Figure 2:
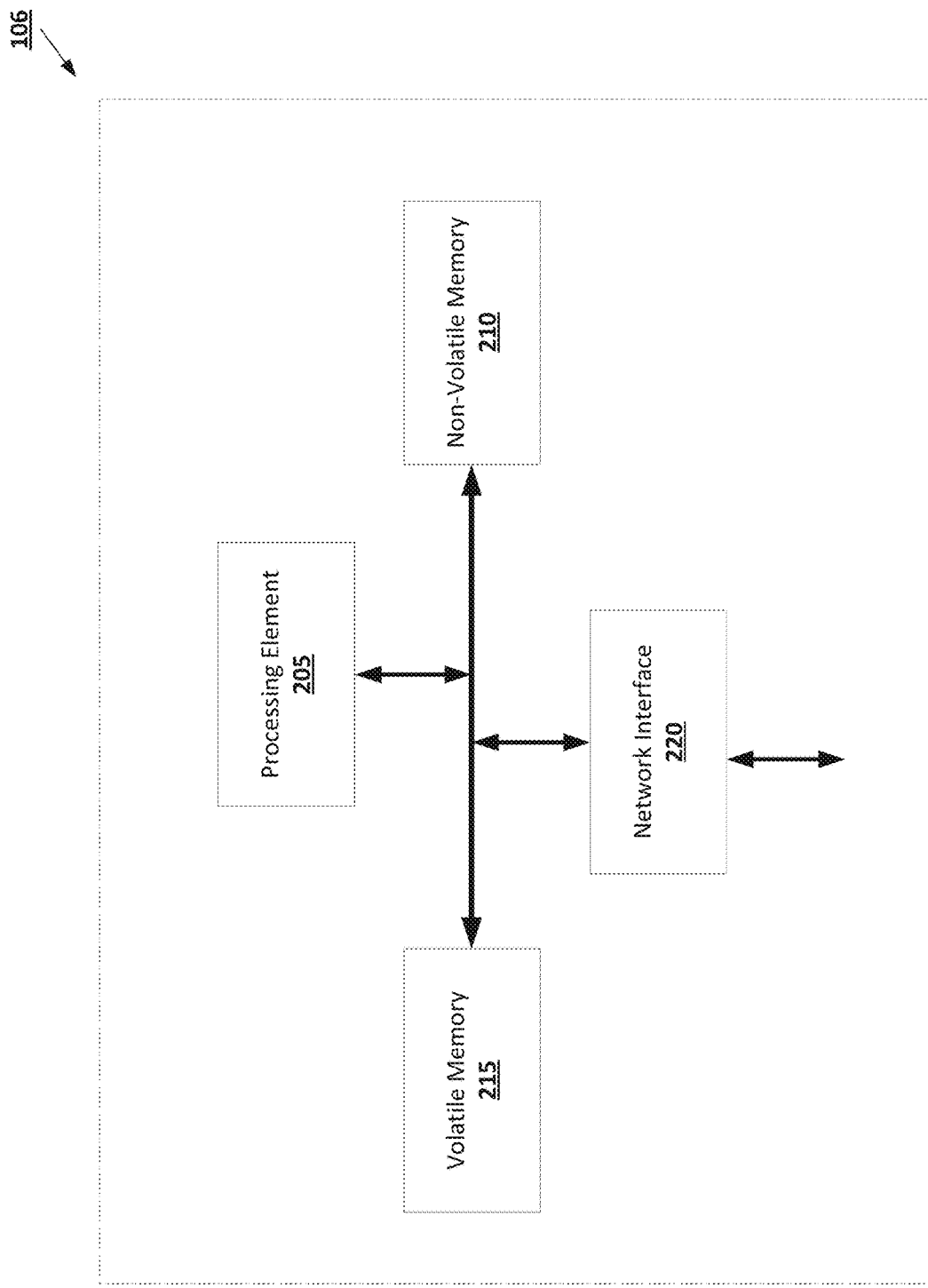

FIG. 2 provides an example hybrid-input predictive computing entity in accordance with some embodiments discussed herein.

Figure 3:
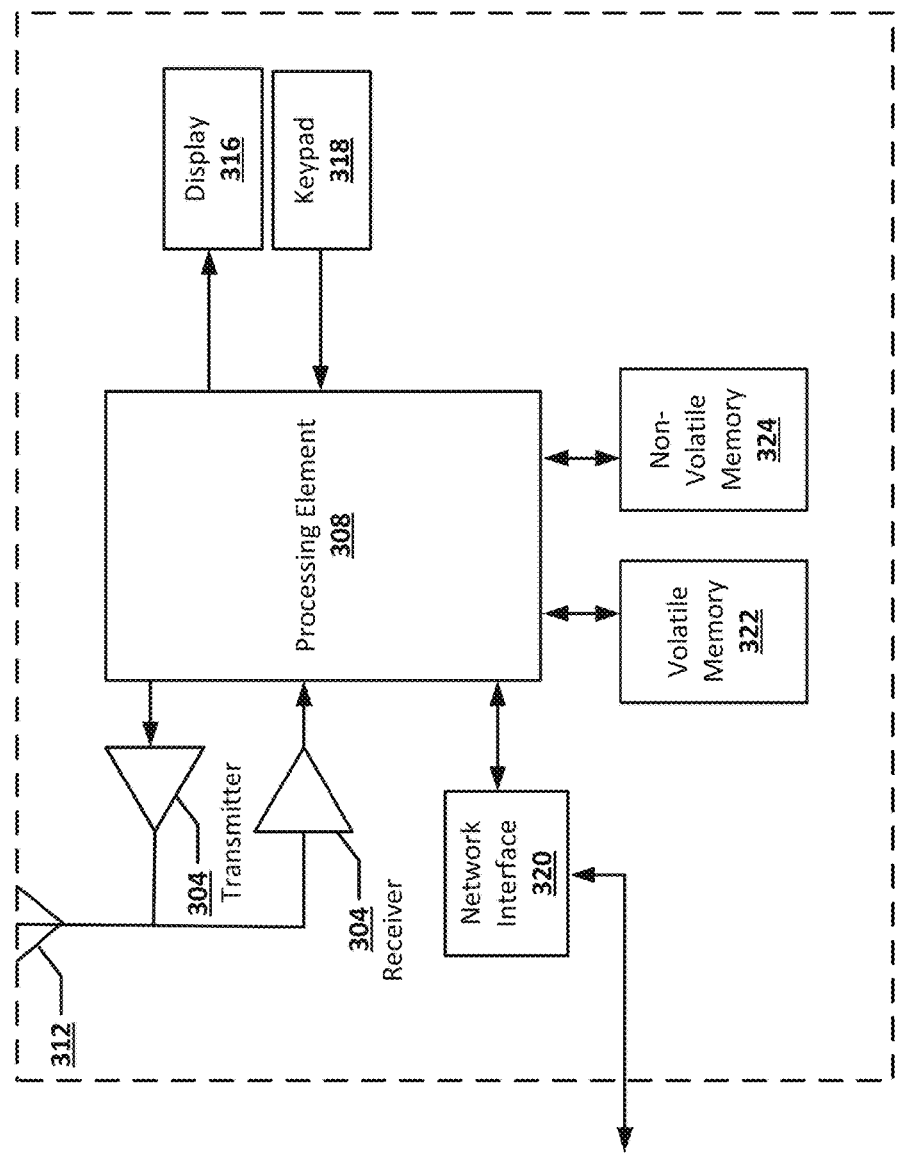

FIG. 3 provides an example client computing entity in accordance with some embodiments discussed herein.

Figure 4:
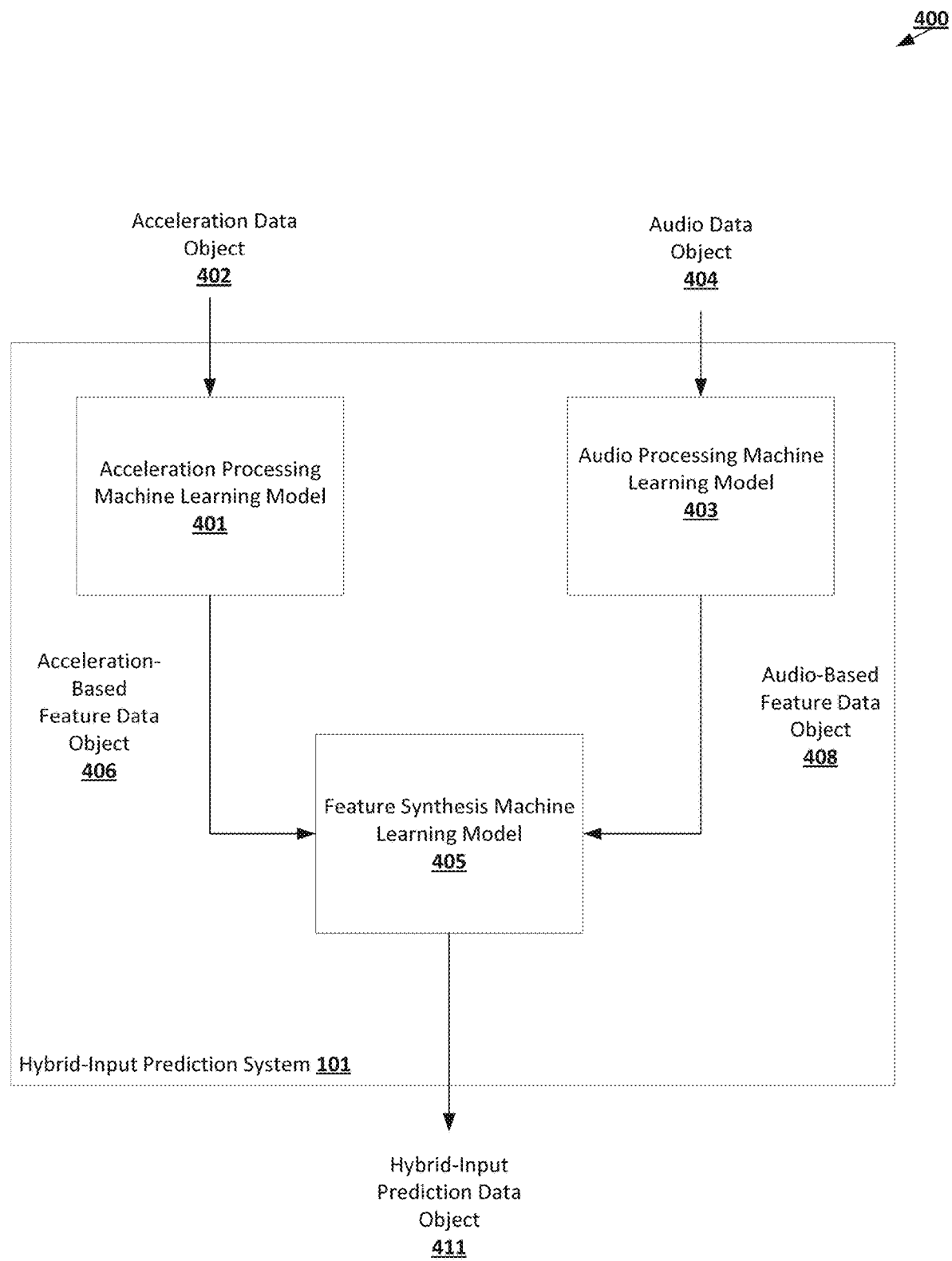

FIG. 4 provides an exemplary schematic of a system for performing hybrid-input prediction steps/operations and generating hybrid-input data objects in accordance with some embodiments discussed herein.

Figure 5:
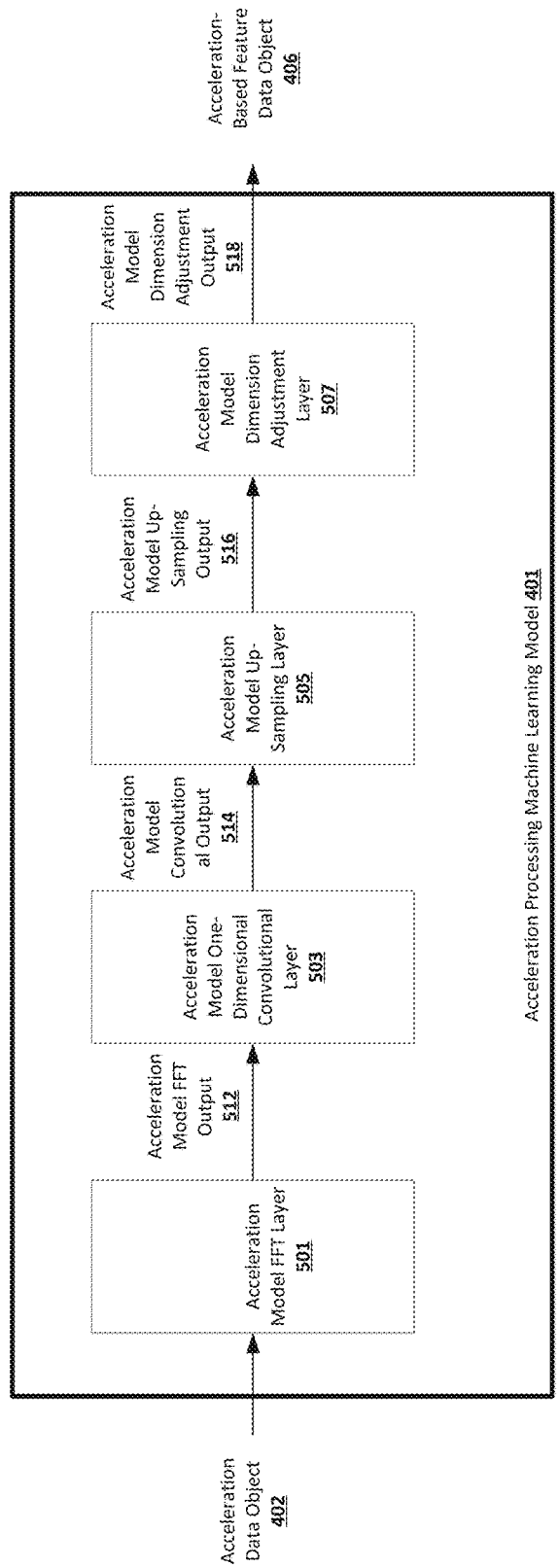

FIG. 5 provides an example acceleration processing machine learning model in accordance with some embodiments discussed herein.

Figure 6:
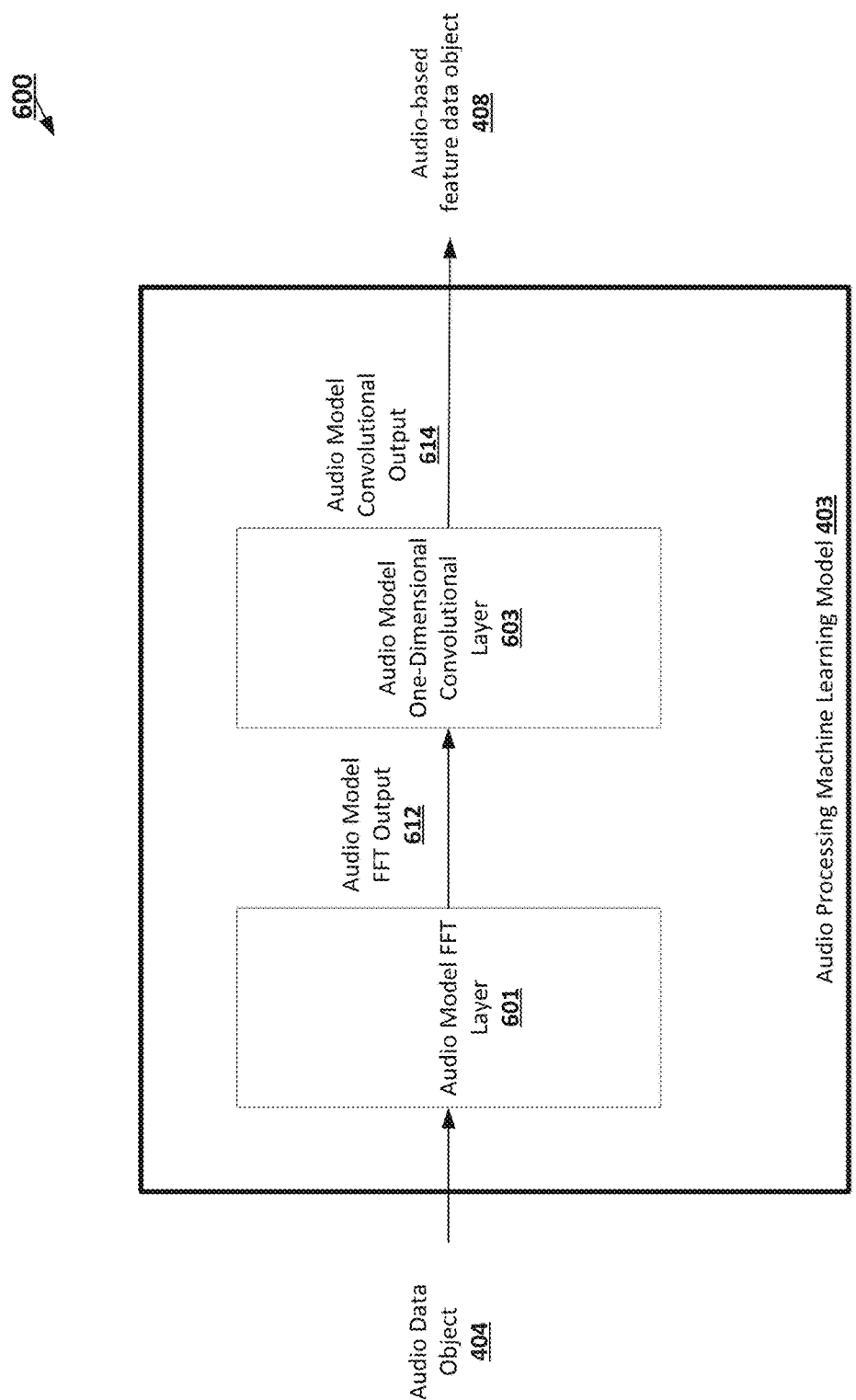

FIG. 6 provides an example audio processing machine learning model in accordance with some embodiments discussed herein.

Figure 7:
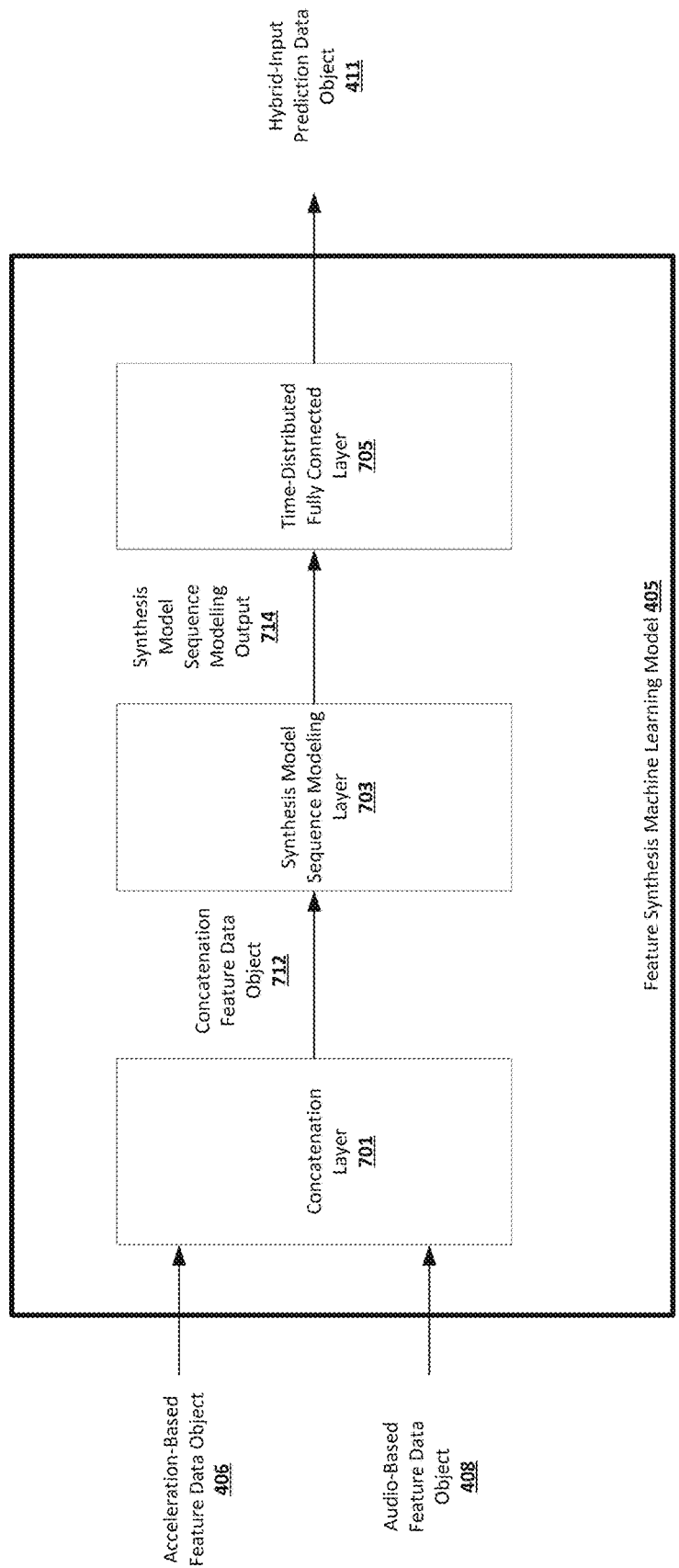

FIG. 7 provides an example feature synthesis machine learning model in accordance with some embodiments discussed herein.

Figure 8:
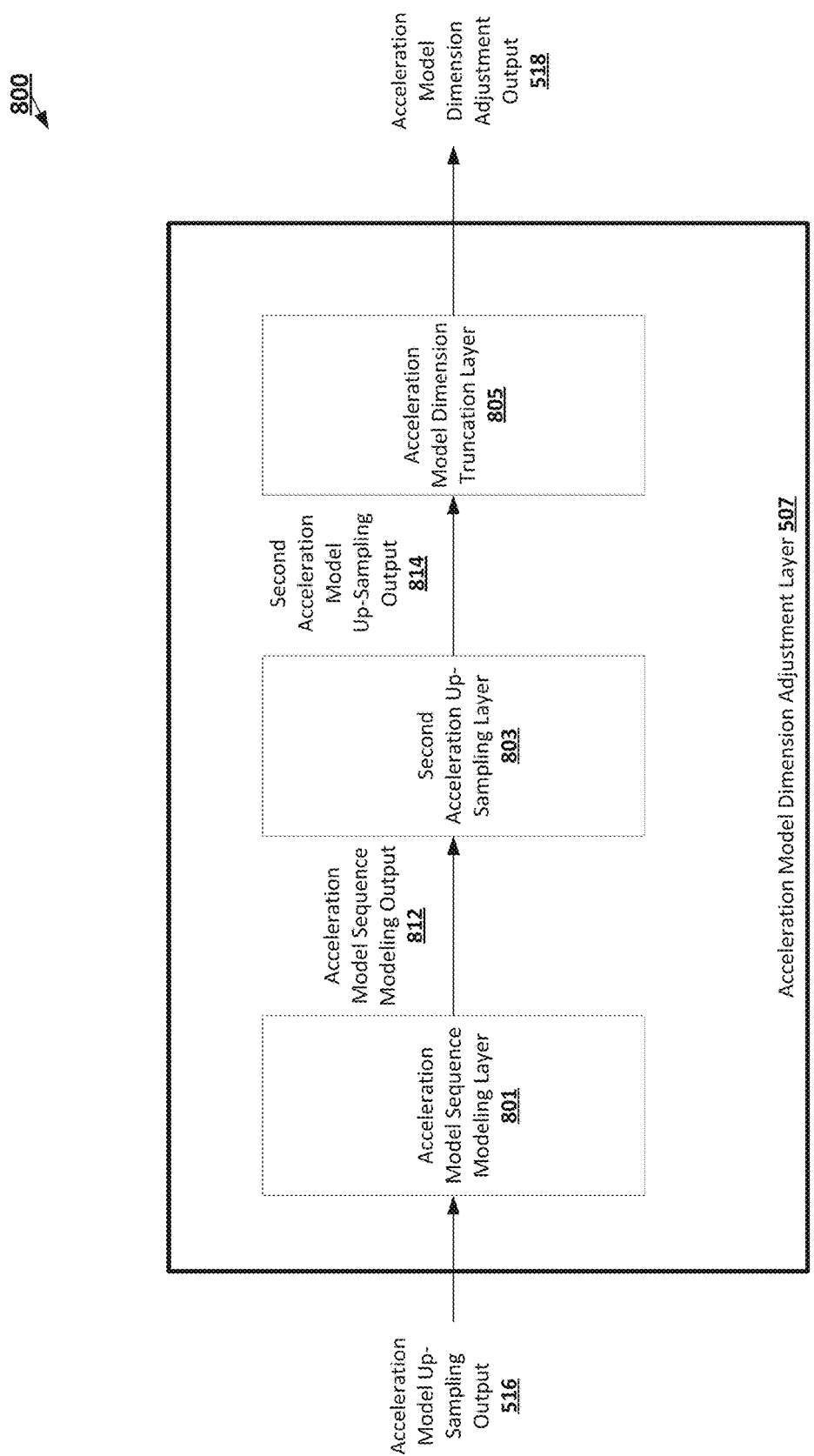

FIG. 8 provides an example acceleration model dimension adjustment layer in accordance with some embodiments discussed herein.

Figure 9:
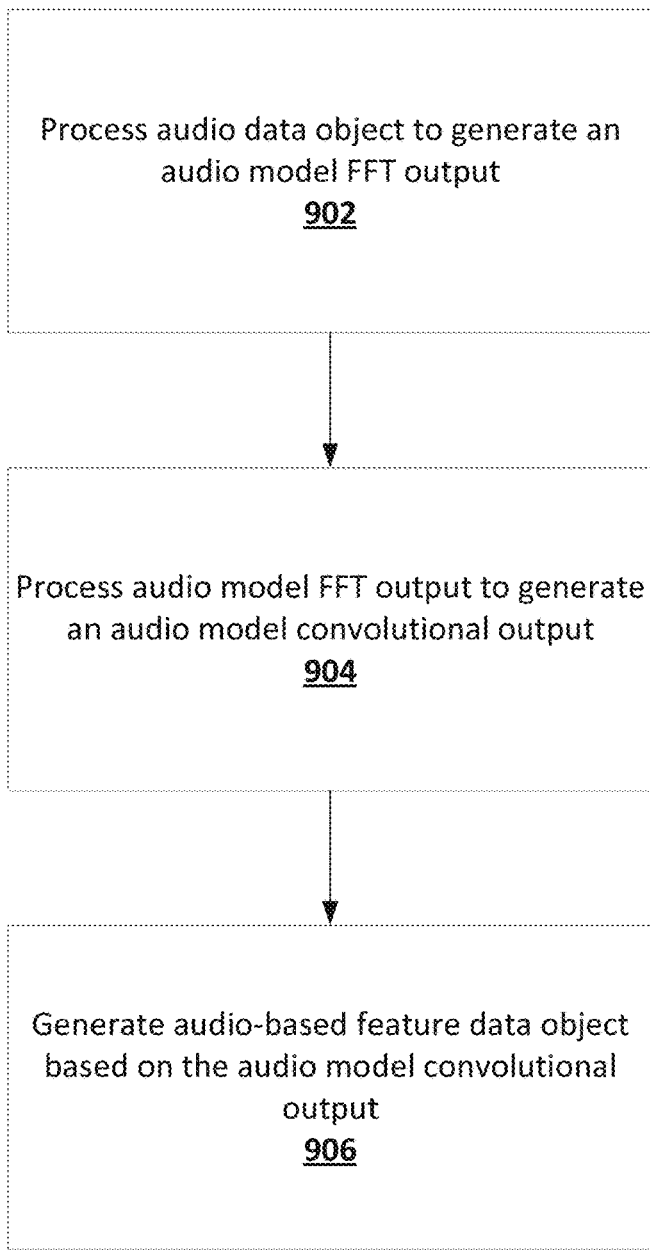

FIG. 9 provides a flowchart of an example process for generating an audio-based feature data object in accordance with some embodiments discussed herein.

Figure 10:
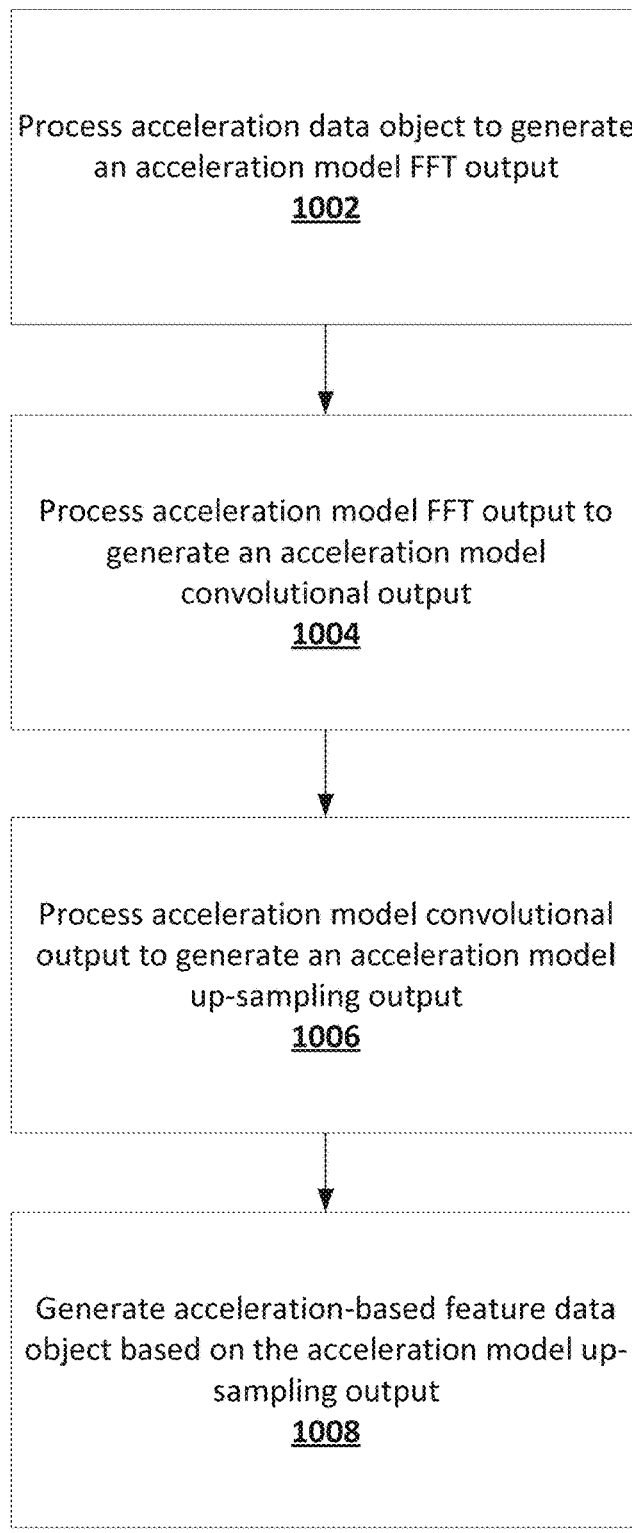

FIG. 10 provides a flowchart of an example process for generating an acceleration-based feature data object in accordance with some embodiments discussed herein.

Figure 11:
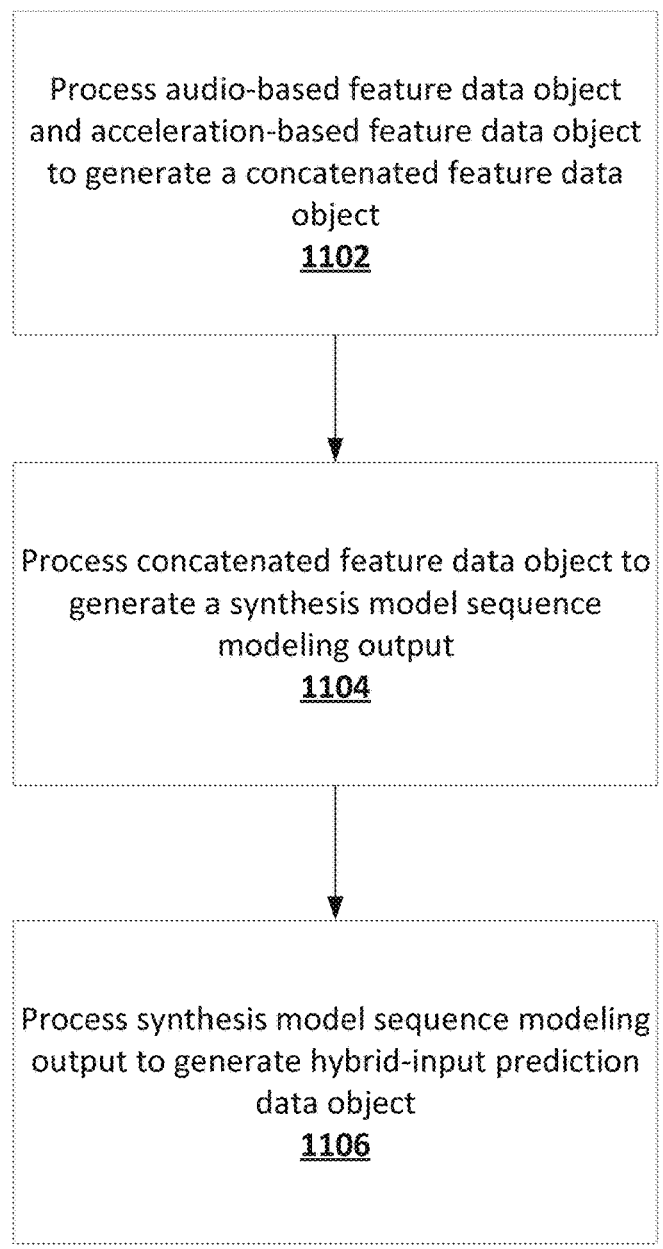

FIG. 11 provides a flowchart of an example process for generating a hybrid-input prediction data object in accordance with some embodiments discussed herein.

Figure 12:
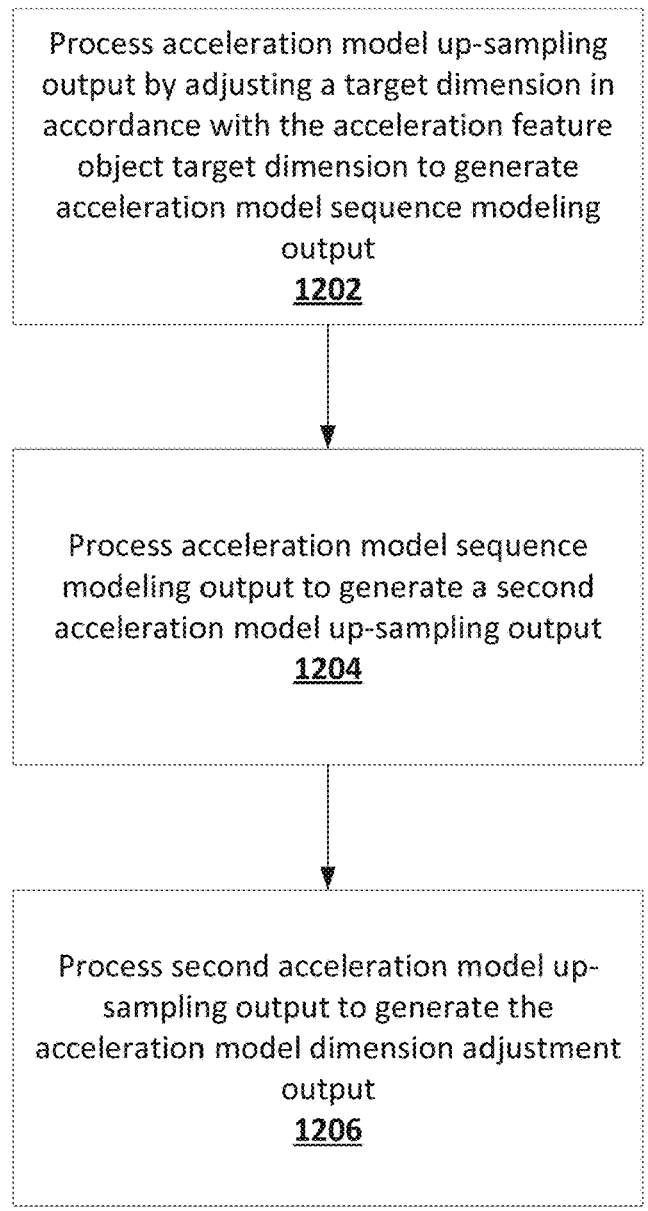

FIG. 12 provides a flowchart of an example process for generating an acceleration model dimension adjustment output in accordance with some embodiments discussed herein.

Figure 13:
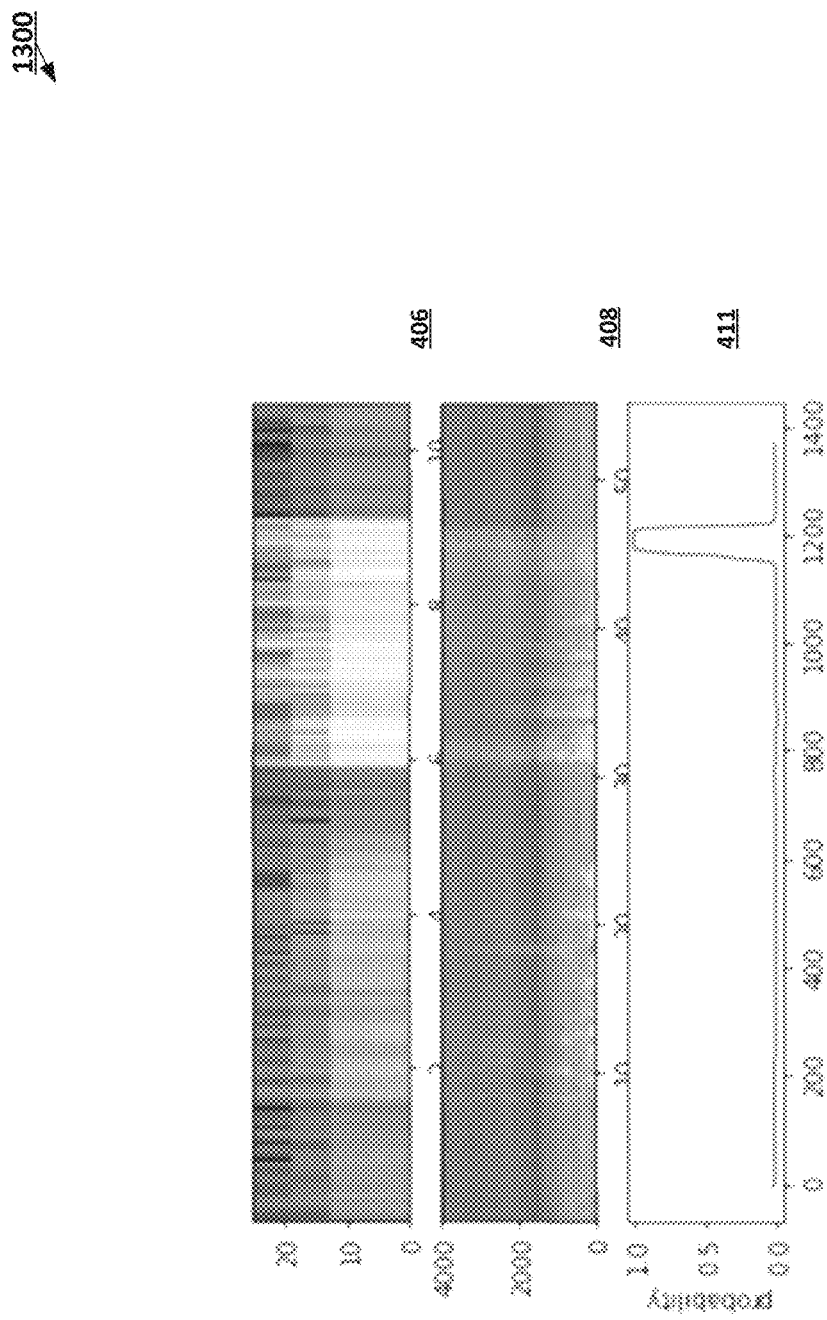

FIG. 13 provides an example graphical representation illustrating various predictive outputs generated by the example hybrid-input prediction data system in accordance with some embodiments discussed herein.

Figure 14:
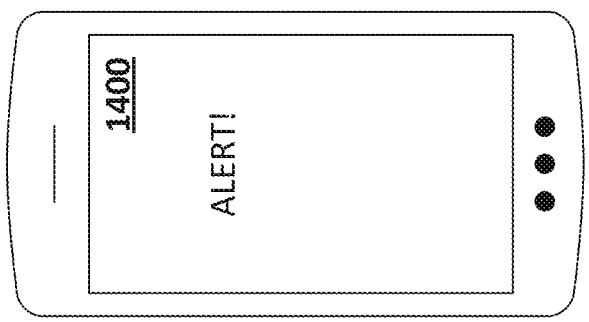

FIG. 14 provides an operational example of generating alerts based at least in part on corresponding hybrid-input predictive outputs in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview

Various embodiments of the present invention disclose techniques for performing joint processing of audio data and acceleration data that improves the efficiency of performing the noted joint processing and reliability of the generated results. Typically, predictive data analysis is performed by processing large amounts of data which are not configured and/or optimized for performing steps/operations on data with dissimilar characteristics (e.g., two or more data objects each having different dimensions and/or describing diverse types of information). There is a need for improved systems and methods configured to process data with dissimilar characteristics. Additionally, there is a need for improving hybrid-input prediction steps/operations to utilize less data and/or sparse data as input such that fewer computing resources are utilized overall. Thus, various embodiments of the present invention improve hybrid-input prediction steps/operations by utilizing less input data or sparse input data without information loss while working within the limitations of the available data. The inventors have confirmed, via experiments and theoretical calculations, that various embodiments of the disclosed techniques improve efficiency and accuracy of hybrid-input prediction systems and predictive data analysis relative to various state-of-the-art solutions.

Various embodiments of the present invention utilize machine learning models configured to perform steps/operations (e.g., convolutional steps/operations, up-sampling steps/operations and/or the like) with respect to two or more dissimilar data objects describing unrelated data (e.g., raw audio data and raw accelerometer data) in order to generate hybrid-input prediction data outputs/objects describing important/novel features of the data contained in the two or more data objects. The machine learning models may modify one or both data objects in order to perform subsequent mathematical/arithmetic steps/operations and important/novel features from the data in the two or more data outputs/objects. Accordingly, accurate predictions can be obtained where some of the available data is limited or sparse and/or where it may be undesirable to utilize more resources to obtain richer data due to a lack of complexity in the underlying type of information. By correlating unrelated data to extract important features using the methods described herein, the resulting hybrid-input prediction data outputs/objects contain rich information and lead to more accurate predictions which may be utilized to generate user interface data (e.g., real-time alerts) for an end user.

Accordingly, by utilizing some or all of the innovative techniques disclosed herein for performing hybrid-input prediction steps/operations, various embodiments of the present invention increase efficiency of data processing and accuracy of predictions. In doing so, various embodiments of the present invention make substantial technical contributions to the field of predictive data analysis and substantially improve state-of-the-art hybrid-input prediction systems.

II. Definitions of Certain Terms

The term "audio data object" may refer to a data object that describes a set of information (e.g., an input dataset) corresponding to sound such as raw audio data (e.g., recorded audio data for a monitored individual). Raw audio data may comprise one or more sound waves. Each sound wave comprises a wavelength oscillating at a given frequency for a duration of time. An audio data object may describe such raw audio data in a time domain representation or the frequency domain representation. Raw audio data may be sampled at a given sampling rate (e.g., 44.1 kHz) to generate a time domain representation. In general, a data object generated based at least in part on a high sampling rate will generate a data object with more information/data than a data object generated based at least in part on a lower sampling rate. An example audio data object may be represented graphically by plotting extracted values/features as a function of time. An audio data object describing raw audio data in the time domain may comprise a two-dimensional matrix in which a first dimension corresponds with a number of segments in time and a second dimension corresponds with a plurality of values/features based at least in part on the frequencies of the sound waves occurring at corresponding segments in time.

The term "acceleration data object" may refer to a data object that describes a set of information (e.g., an input dataset) corresponding to acceleration of motion of a body (e.g., a human) with respect to the body's frame (e.g., raw acceleration data). An example acceleration data object may describe a body's change in orientation and/or movements (e.g., vibrations) in two or more directions (e.g., recorded cross-body acceleration data for a monitored individual). Raw acceleration data may be represented graphically as a waveform plotted with respect to time in which positive values indicate an increase in velocity, negative values indicate a decrease in velocity and zero/null values indicate a constant velocity. An acceleration data object may describe such raw acceleration data in a time domain representation or the frequency domain representation by sampling the raw acceleration data at a given sampling rate (e.g., 50 Hz). Sampling raw acceleration data at a high sampling rate (e.g., 44.1 kHz) is undesirable due to a lack of complexity in the underlying data. An acceleration data object describing raw acceleration data in the time domain may comprise a two-dimensional matrix having a length and a width in which a first dimension corresponds with a number of segments in time and a second dimension corresponds with a plurality of features associated with oscillations at different frequencies occurring at corresponding segments in time.

The term "audio processing machine learning model" may refer to a data object that describes parameters and/or hyper-parameters of machine learning model configured to perform a plurality of steps/operations with respect to an audio data object in order to generate audio-based feature data object. For example, the audio processing machine learning model may comprise a plurality of layers each configured to perform one or more steps/operations with respect to an input data object (e.g., audio data object). Each layer of the audio processing machine learning model may be configured to perform a plurality of steps/operations to modify one or more dimensions of a corresponding input audio data object. An example audio processing machine learning model may comprise at least one audio model fast Fourier transform layer, and at least one audio model one-dimensional convolutional layer.

The term "audio model fast Fourier transform (FFT) layer" may refer to a data object that describes a layer of an audio processing machine learning model configured to process an audio data object using an FFT function and generate an audio model FFT output. The audio model FFT layer is configured to perform a plurality of steps/operations with respect to an audio data object describing raw audio data in the time domain in order to generate an audio data object describing raw audio data in the frequency domain. The resulting audio model FFT output may have dimensions that are different from the dimensions of the input data object (e.g., audio data object). For example, the audio model FFT layer may apply a mask/filter to the input data object (e.g., audio data object) in order to extract relevant features and generate an audio model FFT output describing such features.

The term "audio model FFT output" may refer to a data object that describes the output generated by an audio model FFT layer of an audio processing machine learning model. The audio model FFT output may refer to a data object describing a two-dimensional matrix having a length and a width in which a first dimension corresponds with a plurality of segments in time and a second dimension corresponds with a plurality of relevant features.

The term "audio-based feature data object" may refer to a data object that is generated by an audio processing machine learning model and is configured to describe the output of processing particular audio data by an audio processing machine learning model. An example audio-based feature data object may comprise a two-dimensional matrix having a length and a width in which a first dimension corresponds with a number of segments in time and a second dimension corresponds with a plurality of features associated with frequencies of sound waves occurring at the corresponding segments in time. The audio-based feature data object may comprise dimensions that are different from the dimensions of the input data object (e.g., audio data object) processed by the machine learning model. For instance, the dimensions of the matrix of the audio-based feature data object may be truncated in the first dimension (x-direction) and lengthened in the second dimension (y-direction) such that the audio-based feature data object contains more information sampled over fewer segments in time.

The term "audio model one-dimensional convolutional layer" may refer to a data object that describes layer of a machine learning model configured to perform one or more convolutional steps/operations with respect to an audio model FFT output and generate an audio model convolutional output. The audio model one-dimensional convolutional layer is configured to extract feature data from an audio model FFT output. For example, the audio model one-dimensional convolutional layer may extract feature data from an audio model FFT output in order to generate an audio-based feature data object with different dimensions from the audio model FFT output. An audio model convolutional output may refer to the output generated by an audio model one-dimensional convolutional layer of an audio processing machine learning model.

The term "acceleration processing machine learning model" may refer to a data object that describes parameters and/or hyper-parameters of machine learning model configured to perform a plurality of steps/operations with respect to an acceleration data object and generate an acceleration-based feature data object. For example, the acceleration processing machine learning model may comprise a plurality of layers each configured to perform one or more steps/operations with respect to an input data object (e.g., acceleration data object). Each layer of the acceleration processing machine learning model may be configured to perform a plurality of steps/operations to modify one or more dimensions of a corresponding input acceleration data object. An example acceleration processing machine learning model may comprise at least one acceleration model fast Fourier transform layer, and at least one acceleration model one-dimensional convolutional layer.

The term "acceleration-based feature data object" may refer to a data object that is generated by processing an acceleration data object using an acceleration processing machine learning model. An example acceleration-based feature data object may comprise a two-dimensional matrix having a length and a width in which a first dimension corresponds with a number of segments in time and a second dimension corresponds with a plurality of features associated with oscillations/vibrations occurring at the corresponding segments in time. The acceleration-based feature data object may comprise dimensions that are different from the dimensions of the input data object (e.g., acceleration data object) processed by the machine learning model. For instance, the dimensions of the matrix of the acceleration-based feature data object may be truncated in the first dimension (x-direction) and lengthened in the second dimension (y-direction) such that the acceleration-based feature data object contains more information sampled over fewer segments in time.

The term "acceleration model FFT layer" may refer to a data object that describes a layer of an acceleration processing machine learning model configured to process an acceleration data object using an FFT function and generate an acceleration model FFT output. For example, the acceleration model FFT layer may be configured to perform a plurality of steps/operations with respect to an acceleration data object describing raw acceleration data in the time to domain to generate an acceleration data object describing raw acceleration data in the frequency domain. The resulting acceleration model FFT output may have dimensions that are different from the dimensions of the input data object (e.g., acceleration data object). For example, the acceleration model FFT layer may apply a mask/filter to the input data object (e.g., acceleration data object) in order to extract relevant features and generate an acceleration model FFT output describing such features.

The term "acceleration model FFT output" may refer to a data object that describes the output generated by an acceleration model FFT layer of an acceleration processing machine learning model. The acceleration model FFT output may refer to a data object describing a two-dimensional matrix having a length and a width in which a first dimension corresponds with a plurality of segments in time and a second dimension corresponds with a plurality of relevant features.

The term "acceleration model one-dimensional convolutional layer" may refer to a data object that describes a layer of a machine learning model configured to perform one or more convolutional steps/operations with respect to an input data object (e.g., an acceleration model FFT output) and generate an acceleration model convolutional output. The acceleration model one-dimensional convolutional layer is configured to extract feature data from an acceleration model FFT output. For example, the acceleration model one-dimensional convolutional layer may extract feature data from an acceleration model FFT output in order to generate an acceleration model convolutional output with different dimensions from the acceleration model FFT output.

The term "acceleration model convolutional output" may refer to a data object that describes the output generated by an acceleration model one-dimensional convolutional layer of an acceleration processing machine learning model. In some embodiments, the acceleration model one-dimensional convolutional layer of an acceleration processing machine learning model processes the acceleration model FFT output of an acceleration model FFT layer in order to generate the acceleration model convolutional output.

The term "acceleration model up-sampling layer" may refer to a data object that is configured to describe layer of a machine learning model configured to perform one or more up-sampling steps/operations with respect to an input data object (e.g., acceleration model FFT output or acceleration model convolutional output) in order to generate an acceleration model up-sampling output. The acceleration model up-sampling layer may be configured to transform (e.g., lengthen or truncate) at least one dimension of the input data object (e.g., acceleration model FFT output or acceleration model convolutional output). For example, by increasing the length of at least one dimension (e.g., number of time segments) corresponding with the input data object. The acceleration processing machine learning model may comprise a plurality of acceleration model up-sampling layers, each configured to transform a particular dimension of the input data object. An acceleration model up-sampling output may refer to a data object describing the output generated by the acceleration model up-sampling layer of an acceleration processing machine learning model.

The term "feature synthesis machine learning model" may refer to a data object that is configured to describe parameters and/or hyper-parameters of a machine learning model configured to process two or more input data objects (e.g., an audio-based feature data object and an acceleration-based feature data object) in order to generate an input that integrates features described by both of the two or more input data objects. For example, the feature synthesis machine learning model may be configured to perform a plurality of steps/operations with respect to an audio-based feature data object and an acceleration-based feature data object in order to generate a hybrid-input prediction data object. The feature synthesis machine learning model may comprise one or more layers configured to extract sequential information/understanding (e.g., recognize patterns) in historical data contained in the preceding machine learning model(s) and/or layers.

The term "acceleration model sequence modeling layer" may refer to a data object that describes a layer of an acceleration model dimension adjustment layer of an acceleration model dimension adjustment layer machine learning model configured to process an acceleration model up-sampling output to generate an acceleration model sequence modeling output. An acceleration model sequence modeling output may refer to a data object that describes the output of the acceleration model sequence modeling layer.

The term "hybrid-input prediction data object" may refer to a data object that describes the output of two or more input data objects (e.g., an audio-based feature data object and an acceleration-based feature data object) generated (e.g., combined) by a feature synthesis machine learning model. An example hybrid-input prediction data object may describe a likelihood of an event across one or more time intervals, a frequency of an event across one or more time intervals or a duration of an event across one or more time intervals. For example, a hybrid-input prediction data object may describe a cough likelihood, a cough frequency and/or a cough duration for a monitored individual across one or more time intervals.

The term "target dimension" may refer to a desired length of a dimension of a data object, such as an acceleration-based feature data object and/or an audio-based feature data object. In order to perform particular steps/operations (e.g., concatenate) on two or more data objects (e.g., matrices), at least one dimension of each data object must be equal in length. For instance, in order to perform concatenation and/or addition steps/operations on two data objects of different dimensions, at least one dimension of the first data object must be adjusted to match the corresponding dimension of the second data object. An audio feature object target dimension length may refer to a desired dimension length for one of the dimensions of an audio-based feature data object. An acceleration feature object target dimension length may refer to a desired dimension length for one of the dimensions of an acceleration-based feature data object.

The term "acceleration model dimension adjustment layer" may refer to a data object that describes a layer of an acceleration processing machine learning model that is configured to perform a plurality of steps/operations with respect to an input data object (e.g., an acceleration model up-sampling output), where the plurality of steps/operations are configured to adjust the dimension of an intermediate output of the acceleration processing machine learning in accordance with a target dimension for the intermediate output. An example acceleration model dimension adjustment layer may adjust a dimension of the acceleration model up-sampling output to satisfy a target dimension criteria in accordance with an acceleration feature object target dimension. The acceleration model dimension adjustment layer may comprise one or more layers configured to extract sequential information/understanding (e.g., recognize patterns) in historical data contained in the preceding machine learning model(s) and/or layers. The acceleration model dimension adjustment layer may be configured to modify the sampling rate applied to an input dataset such that one or more dimensions of the corresponding output are lengthened or truncated as desired to the target dimension. An acceleration model dimension adjustment output may refer to a data object that describes the output of an acceleration model dimension adjustment layer of an acceleration processing machine learning model.

The term "model up-sampling layer" may refer to a data object that describes a layer of the acceleration dimension adjustment layer that is configured to perform an up-sampling step/operation on an acceleration model sequence modeling output to generate a second acceleration model up-sampling output. An up-sampling output may refer to a data object that describes the output of a model up-sampling layer. An acceleration model dimension truncation layer may refer to a layer of the dimension adjustment layer that is configured to process the second acceleration model up-sampling output to generate the acceleration model dimension adjustment output.

The term "concatenation layer" may refer to a data object that describes a layer of the feature synthesis machine learning model that is configured to combine (e.g., merge, concatenate, stack and/or the like) two or more data objects (e.g., matrices) to generate an output describing the data in the two or more data objects, where the combination of the two or more data objects is intended to concentrate the values of the two or more data objects along a concatenation dimension (e.g., a horizontal dimension or a vertical dimension). For example, the concatenation layer may be configured to process the audio-based feature data object and the acceleration-based feature data object in order to generate a concatenated feature data object. Concatenation of the audio-based feature data object and the acceleration-based feature data object may include vector-by-vector steps/operations to extract new features from the feature data objects. A concatenated feature data object may refer to a data object that describes the output of the concatenation layer.

The term "synthesis model sequence modeling layer" may refer to a data object that describes a layer of a feature synthesis machine learning model that is configured to perform one or more synthesis model sequence steps/operations with respect to an input data object (e.g., a concatenation feature data object) and generate a synthesis model sequence modeling output. For example, the synthesis model sequence modeling layer, may further modify (e.g., flatten, combine) an input data object to generate the synthesis model sequence modeling output. The synthesis model sequence modeling layer may comprise one or more Gated Recurrent Units (GRUs), Recurrent Neural Networks (RNNs), Long Short-Term Memory (LSTM) units and/or the like.

The term "synthesis model sequence modeling output" may refer to a data object that describes the output of one or more synthesis model sequence modeling layers of a feature synthesis machine learning model. In some embodiments, a feature synthesis machine learning model comprising one or more synthesis model sequence modeling layer processes a concatenation layer output of a concatenation layer to generate a synthesis model sequence modeling output.

The term "time-distributed fully connected layer" may refer to a data object that describes a fully-connected layer of a feature synthesis machine learning model that is configured to perform one or more prediction-based actions with respect to an input data object (e.g. a synthesis model sequence modeling output) and generate a hybrid-input prediction data object. An example of a time-distributed fully connected layer is the time-distributed Dense layer in the Keras application programming interface (API). The time-distributed fully connected layer may process an input data object (e.g., the synthesis model sequence modeling output) by extracting the most relevant feature for each time segment to generate a hybrid input prediction data object. The time-distributed fully connected layer may be configured to determine the likelihood of one or more events based at least in part on the hybrid-input prediction data object. The time-distributed fully connected layer may be configured to determine a frequency or duration corresponding with the one or more events across one or more time intervals. The hybrid input prediction data object may refer to a data object that describes the output of the time-distributed fully connected layer of the feature synthesis machine learning model. An example hybrid input prediction data object may comprise a single vector comprising a single relevant feature corresponding with each time segment.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, steps or operations, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, steps or operations.

IV. Exemplary System Framework

FIG. 1 is a schematic diagram of an example architecture 100 for performing hybrid-input prediction steps/operations. The architecture 100 includes a hybrid-input prediction system 101 configured to receive data from the client computing entities 102, process the data to generate outputs (e.g., hybrid-input predictive data objects) and provide the outputs to the client computing entities 102 for generating corresponding alerts (e.g., for providing and/or updating a user interface). In some embodiments, hybrid-input prediction system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The hybrid-input prediction system 101 may include a hybrid-input predictive computing entity 106, and a storage subsystem 108. The hybrid-input predictive computing entity 106 may be configured to receive requests and/or data from client computing entities 102, process the requests and/or data to generate predictive outputs (e.g., hybrid-input prediction data objects), and provide the predictive outputs to the client computing entities 102. The client computing entities 102 may be triggered to transmit requests to the hybrid-input predictive computing entity 106 in response to events which satisfy certain parameters (e.g., monitored events). Responsive to receiving the predictive outputs, the client computing entities 102 may generate corresponding alerts and may provide (e.g., transmit, send and/or the like) corresponding user interface data for presentation to user computing entities.

The storage subsystem 108 may be configured to store at least a portion of the data utilized by the hybrid-input predictive computing entity 106 to perform hybrid-input prediction steps/operations and tasks. The storage subsystem 108 may be configured to store at least a portion of operational data and/or operational configuration data including operational instructions and parameters utilized by the hybrid-input predictive computing entity 106 to perform hybrid-input prediction steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Hybrid-Input Predictive Computing Entity

FIG. 2 provides a schematic of a hybrid-input predictive computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the hybrid-input predictive computing entity 106 may also include one or more network interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the hybrid-input predictive computing entity 106 may include or be in communication with one or more processing elements 205 (also referred to as processors, processing circuitry, and/or similar terms used herein interchangeably) that communicate with other elements within the hybrid-input predictive computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the hybrid-input predictive computing entity 106 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the hybrid-input predictive computing entity 106 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the hybrid-input predictive computing entity 106 with the assistance of the processing element 205 and operating system.

As indicated, in one embodiment, the hybrid-input predictive computing entity 106 may also include one or more network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the hybrid-input predictive computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the hybrid-input predictive computing entity 106 may include or be in communication with one or more input elements, such as a keyboard input, a mouse input, a touch screen/display input, motion input, movement input, audio input, pointing device input, joystick input, keypad input, and/or the like. The hybrid-input predictive computing entity 106 may also include or be in communication with one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the hybrid-input predictive computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the hybrid-input predictive computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MIMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the hybrid-input predictive computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the hybrid-input predictive computing entity 106 and/or various other computing entities.

In another embodiment, the client computing entity 102 may include one or more components or functionality that are the same or similar to those of the hybrid-input predictive computing entity 106, as described in greater detail above. As will be recognized, these frameworks and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

Described herein are various techniques for hybrid-input prediction steps/operations on two or more dissimilar data objects. Some of the disclosed techniques may utilize one or more machine learning models to perform hybrid-input prediction steps/operations (e.g., convolutional steps/operations, up-sampling steps/operations and the like). Some of the described techniques utilize a particular configuration of machine learning models and/or layers. The output of a machine learning model and/or layers therein may be supplied as an input for subsequent steps/operations by another machine learning model and/or layer. However, a person of ordinary skill in the art will recognize that hybrid-input prediction steps/operations discussed herein may be performed using different combinations than the particular combinations described herein.

By facilitating efficient hybrid-input prediction steps/operations, various embodiments of the present invention improve hybrid-input prediction steps/operations on two or more dissimilar data objects. Modifying data objects according to the methods disclosed herein reduces the need for additional processing power and in turn reduces processing latency. This in turn reduces the need for large amounts of data to provide accurate predictive outputs.

FIG. 4 provides a schematic representation of an example system 400 for performing hybrid-input prediction steps/operations and generating corresponding predictive outputs/user interface data. The hybrid-input prediction system 101 may receive data from one or more client computing entities 102 and store at least a portion of the data in the storage subsystem 108. The storage subsystem 108 may provide acceleration and audio data objects 402, 404 to the hybrid-input predictive computing entity 106. The hybrid-input prediction system 101 may be configured to perform steps/operations that lead to generating hybrid-input prediction data objects 411 and user interface data. For example, the hybrid-input predictive computing entity 106 may comprise a plurality of machine learning models each configured to perform an associated set of hybrid-input input prediction steps/operations. The hybrid-input prediction system 101 may process two or more input data objects (e.g., an acceleration data object 402, and an audio data object 404) and generate a predictive output (e.g., one or more hybrid-input prediction data objects 411).

Exemplary Acceleration Processing Machine Learning Model

As illustrated in FIG. 4, the hybrid-input prediction system 101 comprises an acceleration processing machine learning model 401 configured to process an acceleration data object 402 and generate an acceleration-based feature data object 406. The acceleration processing machine learning model 401 may refer to a machine learning model configured to perform a plurality of steps/operations with respect to an acceleration data object 402. An acceleration data object 402 may refer to a data object that describes a set of information (e.g., an input dataset) corresponding to acceleration of motion of a body (e.g., a human) with respect to the body's frame (e.g., raw acceleration data). An example acceleration data object 402 may describe a body's change in orientation and/or movements (e.g., vibrations) in two or more directions (e.g., recorded cross-body acceleration data for a monitored individual). Raw acceleration data may be represented graphically as a waveform plotted with respect to time in which positive values indicate an increase in velocity, negative values indicate a decrease in velocity and zero/null values indicate a constant velocity. An acceleration data object 402 may describe such raw acceleration data in a time domain representation or the frequency domain representation by sampling the raw acceleration data at a given sampling rate (e.g., 50 Hz). Sampling raw acceleration data at a high sampling rate (e.g., 44.1 kHz) is undesirable due to a lack of complexity in the underlying data. An acceleration data object 402 describing raw acceleration data in the time domain may comprise a two-dimensional matrix having a length and a width in which a first dimension corresponds with a number of segments in time and a second dimension corresponds with a plurality of features associated with oscillations at different frequencies occurring at corresponding segments in time. An acceleration-based feature data object 406 may refer to a data object that is generated by processing an acceleration data object 402 using an acceleration processing machine learning model 401. An example acceleration-based feature data object 406 may comprise a two-dimensional matrix having a length and a width in which a first dimension corresponds with a number of segments in time and a second dimension corresponds with a plurality of features associated with oscillations/vibrations occurring at the corresponding segments in time. The acceleration-based feature data object 406 may comprise dimensions that are different from the dimensions of the input data object (e.g., acceleration data object 402) processed by the acceleration processing machine learning model 401. For instance, the dimensions of the matrix of the acceleration-based feature data object 406 may be truncated in the first dimension (x-direction) and lengthened in the second dimension (y-direction) such that the acceleration-based feature data object 406 contains more information sampled over fewer segments in time.

FIG. 10 is a flowchart diagram illustrating an example process for generating an acceleration-based feature data object 406 by an acceleration processing machine learning model 401. The process depicted in FIG. 10 begins at step/operation 1002, when the acceleration processing machine learning model 401 processes the acceleration data object 402 to generate the acceleration model FFT output 512. At step/operation 1004, the acceleration processing machine learning model 401 processes the acceleration model FFT output 512 to generate an acceleration model convolutional output 514. At step/operation 1006, the acceleration processing machine learning model 401 processes the acceleration model convolutional output 514 to generate an acceleration model up-sampling output 516. Then, at step/operation 1008, the acceleration processing machine learning model 401 generates the acceleration-based feature data object 406 based at least in part on the acceleration model up-sampling output 516.

FIG. 5 provides a schematic representation of an example system 500 for generating an acceleration-based feature data object 406 by an acceleration processing machine learning model 401. The acceleration processing machine learning model 401 may comprise a plurality of layers configured to process the acceleration data object 402 and generate an acceleration-based feature data object 406.

As illustrated in FIG. 5 the acceleration processing machine learning model 401 comprises an acceleration model FFT layer 501 configured to process an acceleration data object 402 using an FFT function and generate an acceleration model FFT output 512. The acceleration model FFT layer 501 may refer to a layer of an acceleration processing machine learning model 401 configured to process an acceleration data object 402 using an FFT function and generate an acceleration model FFT output 512. For example, the acceleration model FFT layer 501 may be configured to perform a plurality of steps/operations with respect to an acceleration data object 402 describing raw acceleration data in the time to domain to generate an acceleration data object 402 describing raw acceleration data in the frequency domain. The resulting acceleration model FFT output 512 may have dimensions that are different from the dimensions of the input data object (e.g., acceleration data object 402). For example, the acceleration model FFT layer 501 may apply a mask/filter to the input data object (e.g., acceleration data object 402) in order to extract relevant features and generate the acceleration model FFT output 512 describing such features. The acceleration model FFT output 512 may refer to the output generated by an acceleration model FFT layer 501 of an acceleration processing machine learning model 401. The acceleration model FFT output 512 may refer to a data object describing a two-dimensional matrix having a length and a width in which a first dimension corresponds with a plurality of segments in time and a second dimension corresponds with a plurality of relevant features.

As illustrated in FIG. 5, the acceleration processing machine learning model 401 comprises an acceleration model one-dimensional convolutional layer 503 configured to perform one or more convolutional steps/operations with respect to an acceleration model FFT output 512 and generate an acceleration model convolutional output 514. An acceleration model one-dimensional convolutional layer 503 may refer to a layer of a machine learning model configured to perform one or more convolutional steps/operations with respect to an input data object (e.g., an acceleration model FFT output 512) and generate an acceleration model convolutional output 514. The acceleration model one-dimensional convolutional layer 503 is configured to extract feature data from an acceleration model FFT output 512. For example, the acceleration model one-dimensional convolutional layer 503 may extract feature data from an acceleration model FFT output 512 in order to generate an acceleration model convolutional output 514 with different dimensions from the acceleration model FFT output 512. An acceleration model convolutional output 514 may refer to a data object that describes the output generated by an acceleration model one-dimensional convolutional layer 503 of an acceleration processing machine learning model 401.

As illustrated in FIG. 5, the acceleration processing machine learning model 401 comprises an acceleration model up-sampling layer 505 configured to perform one or more up-sampling steps/operations with respect to an acceleration model convolutional output 514 and generate an acceleration model up-sampling output 516. The acceleration model up-sampling layer 505 may refer to a layer of an acceleration processing machine learning model 401 configured to perform one or more up-sampling steps/operations with respect to an input data object (e.g., acceleration model convolutional output 514) in order to generate an acceleration model up-sampling output 516. The acceleration model up-sampling layer 505 may be configured to transform (e.g., lengthen or truncate) at least one dimension of the input data object (e.g., acceleration model convolutional output 514). For example, by increasing the length of at least one dimension (e.g., number of time segments) corresponding with the input data object. The acceleration processing machine learning model 401 may comprise a plurality of acceleration model up-sampling layers 505, each configured to transform a particular dimension of a respective input data object. An acceleration model up-sampling output 516 may refer to a data object describing the output generated by the acceleration model up-sampling layer 505 of an acceleration processing machine learning model 401. As further illustrated in FIG. 5, the acceleration processing machine learning model 401 comprises an acceleration model dimension adjustment layer 507 configured to perform one or more dimension adjustment steps/operations with respect to an acceleration model up-sampling output 516 and generate an acceleration model dimension adjustment output 518.

FIG. 8 provides a schematic 800 illustrating an exemplary acceleration model dimension adjustment layer 507. The acceleration model dimension adjustment layer 507 may comprise one or more layers of the acceleration processing machine learning model 401 configured to process the acceleration model up-sampling output 516 and generate the acceleration model dimension adjustment output 518. The acceleration model dimension adjustment layer 507 may refer to one or more layers of an acceleration processing machine learning model 401 configured to perform a plurality of up-sampling steps/operations with respect to an input data object (e.g., an acceleration model up-sampling output 516). The plurality of steps/operations are configured to adjust the dimension of an intermediate output of the acceleration processing machine learning model 401 in accordance with a target dimension for the intermediate output. An example acceleration model dimension adjustment layer 507 may adjust a dimension of the acceleration model up-sampling output to satisfy target dimension criteria in accordance with an acceleration-based feature object target dimension. The target dimension may refer to a desired length of a dimension of a data object. In order to perform particular steps/operations (e.g., concatenate) on two or more data objects (e.g., matrices), at least one dimension of each data object must be equal in length. For instance, in order to perform steps/operations on two data objects of different dimensions, at least one dimension of the first data object must be adjusted to match the corresponding dimension of the second data object. An audio feature object target dimension length may refer to a desired dimension length for one of the dimensions of an audio-based feature data object. An acceleration feature object target dimension length may refer to a desired dimension length for one of the dimensions of an acceleration-based feature data object. The acceleration model dimension adjustment layer 507 may comprise one or more layers configured to extract sequential information/understanding (e.g., recognize patterns) in historical data contained in the preceding machine learning model(s) and/or layers. The acceleration model dimension adjustment layer 507 may be configured to modify the sampling rate applied to an input dataset such that one or more dimensions of the corresponding output are lengthened or truncated as desired to the target dimension. An acceleration model dimension adjustment output 518 may refer to a data object that describes the output of an acceleration model dimension adjustment layer 507 of an acceleration processing machine learning model 401.

As illustrated in FIG. 8, the acceleration model dimension adjustment layer 507 comprises an acceleration model sequence modeling layer 801 configured to process an acceleration model up-sampling output 516 to generate an acceleration model sequence modeling output 812. The acceleration model sequence modeling layer 801 may refer to a layer of an acceleration model dimension adjustment layer 507 of an acceleration processing machine learning model 401 configured to process an acceleration model up-sampling output 516 to generate an acceleration model sequence modeling output. An acceleration model sequence modeling output 812 may refer to a data object that describes the output of the acceleration model sequence modeling layer 801. As further illustrated in FIG. 8, the acceleration model dimension adjustment layer 507 comprises a second acceleration up-sampling layer 803 configured to process the acceleration model sequence modeling output 812 to generate a second acceleration model up-sampling output 814. While various embodiments of the present invention disclose using two up-sampling layers by an acceleration model dimension adjustment layer, a person of ordinary skill in the relevant technology will recognize that an acceleration model dimension adjustment layer may comprise any number of up-sampling layers. As further illustrated in FIG. 8, the acceleration model dimension adjustment layer 507 comprises an acceleration model dimension truncation layer 805 configured to process the second acceleration model up-sampling output 814 to generate the acceleration model dimension adjustment output 518.

FIG. 12 is a flowchart diagram illustrating an example process for generating the acceleration model dimension adjustment output 518 by the acceleration model dimension adjustment layer 507. The process depicted in FIG. 12 begins at step/operation 1202, when the acceleration model sequence modeling layer 801 of the acceleration model dimension adjustment layer 507 processes the acceleration model up-sampling output by adjusting a target dimension in accordance with the acceleration feature object target dimension to generate the acceleration model sequence modeling output 812. At step/operation 1204, the second acceleration up-sampling layer 803 of the acceleration model dimension adjustment layer 507 processes the acceleration modeling sequence modeling output to generate a second acceleration model up-sampling output 814. At step/operation 1206, the acceleration model dimension truncation layer 805 or the acceleration model dimension adjustment layer 507 processes the second acceleration model up-sampling layer to generate the acceleration model dimension adjustment output 518.

Exemplary Audio Processing Machine Learning Model

Returning to FIG. 4, the hybrid-input prediction system 101 comprises an audio processing machine learning model 403 configured to process an audio data object 404 and generate an audio-based feature data object 408. The audio processing machine learning model 403 may refer to a machine learning model configured to perform a plurality of steps/operations with respect to an audio data object 404. An audio data object 404 may refer to may refer to a data object that describes a set of information (e.g., an input dataset) corresponding to sound such as raw audio data (e.g., recorded audio data for a monitored individual). Raw audio data may comprise one or more sound waves. Each sound wave comprises a wavelength oscillating at a given frequency for a duration of time. An audio data object 404 may describe such raw audio data in a time domain representation or the frequency domain representation. Raw audio data may be sampled at a given sampling rate (e.g., 44.1 kHz) to generate a time domain representation. In general, a data object generated based at least in part on a high sampling rate will generate a data object with more information/data than a data object generated based at least in part on a lower sampling rate. An example audio data object 404 may be represented graphically by plotting extracted values/features as a function of time. An audio data object 404 describing raw audio data in the time domain may comprise a two-dimensional matrix in which a first dimension corresponds with a number of segments in time and a second dimension corresponds with a plurality of values/features based at least in part on the frequencies of the sound waves occurring at corresponding segments in time. An audio-based feature data object 408 may refer to a data object that is generated by an audio processing machine learning model 403. An example audio-based feature data object 408 may comprise a two-dimensional matrix having a length and a width in which a first dimension corresponds with a number of segments in time and a second dimension corresponds with a plurality of features associated with frequencies of sound waves occurring at the corresponding segments in time. The audio-based feature data object 408 may comprise dimensions that are different from the dimensions of the input data object (e.g., audio data object 404) processed by the audio processing machine learning model 403. For instance, the dimensions of the matrix of the audio-based feature data object 408 may be truncated in the first dimension (x-direction) and lengthened in the second dimension (y-direction) such that the audio-based feature data object 408 contains more information sampled over fewer segments in time.

FIG. 6 a schematic representation of an example system 600 for generating an audio-based feature data object 408 by an audio processing machine learning model 403. The audio processing machine learning model 403 may comprise a plurality of layers configured to process the audio data object 404 and generate an audio-based feature data object 408. The audio processing machine learning model 403 may refer to a machine learning model configured to perform a plurality of steps/operations with respect to an audio data object 404 in order to generate an audio-based feature data object 408. For example, the audio processing machine learning model 403 may comprise a plurality of layers each configured to perform one or more steps/operations with respect to an input data object (e.g., audio data object 404). Each layer of the audio processing machine learning model 403 may be configured to perform a plurality of steps/operations to modify one or more dimensions of a corresponding input (e.g., audio data object 404). An example audio processing machine learning model 403 may comprise at least one audio model fast Fourier transform layer 601, and at least one audio model one-dimensional convolutional layer 603.

As illustrated in FIG. 6, the audio processing machine learning model 403 comprises an audio model fast Fourier transform (FFT) layer 601 configured to process an audio data object 404 using an FFT function and generate an audio model FFT output 612. The audio model FFT layer 601 is configured to perform a plurality of steps/operations with respect to an audio data object 404 describing raw audio data in the time domain in order to generate an audio data object describing raw audio data in the frequency domain. The resulting audio model FFT output 612 may have dimensions that are different from the dimensions of the input data object (e.g., audio data object 404). For example, the audio model FFT layer 601 may apply a mask/filter to the input data object (e.g., audio data object 404) in order to extract relevant features and generate the audio model FFT output 612 describing such features. The audio model FFT output 612 may refer to the output generated by an audio model FFT layer 601 of an audio processing machine learning model 403. The audio model FFT output 612 may refer to a data object describing a two-dimensional matrix having a length and a width in which a first dimension corresponds with a plurality of segments in time and a second dimension corresponds with a plurality of relevant features.

As illustrated in FIG. 6, the audio processing machine learning model 403 comprises an audio model one-dimensional convolutional layer 603 configured to perform one or more convolutional steps/operations with respect to an audio model FFT output 612 and generate an audio model convolutional output 614. The audio model one-dimensional convolutional layer 603 is configured to perform one or more convolutional steps/operations with respect to an audio model FFT output 612 and generate an audio model convolutional output 614. The audio model one-dimensional convolutional layer 603 is configured to extract feature data from the audio model FFT output 612. For example, the audio model one-dimensional convolutional layer 603 may extract feature data from the audio model FFT output 612 in order to generate an audio-based feature data object 408 with different dimensions from the audio model FFT output 612. An audio model convolutional output 614 may refer to the output or intermediary output generated by an audio model one-dimensional convolutional layer 603 of an audio processing machine learning model 403.

FIG. 9 is a flowchart diagram illustrating an example process for generating an audio-based feature data object 408 by an audio processing machine learning model 403. The process depicted in FIG. 9 begins at step/operation 902, when the audio model FFT layer 601 of the audio processing machine learning model 403 processes the audio data object 404 to generate an audio model FFT output 612. At step/operation 904, the audio model one-dimensional convolutional layer 603 or the audio processing machine learning model 403 processes the audio model FFT output 612 to generate an audio model convolutional output 614. At step/operation 906, the audio processing machine learning model generates an audio-based feature data object 408 based at least in part on the audio model convolutional output 614.

Exemplary Feature Synthesis Machine Learning Model

As further illustrated in FIG. 4, the hybrid-input prediction system 101 comprises a feature synthesis machine learning model 405. The feature synthesis machine learning model 405 may receive, as input, the acceleration-based feature data object 406 and the audio-based feature data object 408. The feature synthesis machine learning model 405 may process the acceleration-based feature data object 406 and the audio-based feature data object 408 and generate a hybrid-input prediction data object 411. The feature synthesis machine learning model 405 may refer to a machine learning model configured to process two or more input data objects (e.g., an audio-based feature data object 408 and an acceleration-based feature data object 406) in order to generate an input that integrates features described by both of the two or more input data objects. For example, the feature synthesis machine learning model 405 may be configured to perform a plurality of steps/operations with respect to an audio-based feature data object 408 and an acceleration-based feature data object 406 in order to generate a hybrid-input prediction data object 411. The feature synthesis machine learning model 405 may comprise one or more layers configured to extract sequential information/ understanding (e.g., recognize patterns) in historical data contained in the preceding machine learning model(s) and/or layers. A hybrid-input prediction data object 411 may refer to a data object that describes the output of two or more input data objects (e.g., an audio-based feature data object 408 and an acceleration-based feature data object 406) generated (e.g., merged, combined and/or the like) by a feature synthesis machine learning model 405.

FIG. 7 provides an example system 700 for generating a hybrid-input prediction data object 411 by a feature synthesis machine learning model 405. As shown, the feature synthesis machine learning model 405 comprises a plurality of layers configured to process two input data objects (e.g., the audio-based feature data object 408 and the acceleration-based feature data object 406) in order to generate an output (e.g., hybrid-input prediction data object 411) that integrates features described by both of the input data objects.

As illustrated in FIG. 7, the feature synthesis machine learning model 405 comprises a concatenation layer 701 configured to process an acceleration-based feature data object 406 and an audio-based feature data object 408 to generate a concatenation feature data object 712. The concatenation layer 701 may refer to a layer of the feature synthesis machine learning model 405 that is configured to combine (e.g., merge, stack and/or the like) two or more data objects (e.g., matrices) to generate an output describing features in the two or more data objects, where the combination of the two or more data objects is intended to concentrate the values of the two or more data objects along a concatenation dimension (e.g., a horizontal dimension or a vertical dimension). For example, as shown, the concatenation layer 701 is configured to process the audio-based feature data object 408 and the acceleration-based feature data object 406 in order to generate a concatenation feature data object 712. Concatenation of the audio-based feature data object 408 and the acceleration-based feature data object 406 may include vector-by-vector steps/operations to extract new features from the respective data objects. A concatenation feature data object 712 may refer to a data object that describes the output of the concatenation layer 701.

As illustrated in FIG. 7, the feature synthesis machine learning model 405 comprises a synthesis model sequence modeling layer 703. The synthesis model sequence modeling layer 703 may refer to a layer of a feature synthesis machine learning model 405 that is configured to perform one or more synthesis model sequence steps/operations with respect to an input data object (e.g., a concatenation feature data object 712) and generate a synthesis model sequence modeling output 714. For example, the synthesis model sequence modeling layer 703, may further modify (e.g., flatten, combine) the input data object to generate the synthesis model sequence modeling output 714. The synthesis model sequence modeling layer 703 may comprise one or more gated recurrent units (GRUs), Recurrent Neural Networks (RNNs), Long Short-Term Memory (LSTM) units and/or the like. The synthesis model sequence modeling output 714 may refer to a data object that describes the output of one or more synthesis model sequence modeling layers 703 of a feature synthesis machine learning model 405.

As illustrated in FIG. 7, the feature synthesis machine learning model 405 comprises a time-distributed fully connected layer 705 configured to process a synthesis model sequence modeling output 714 to generate a hybrid-input prediction data object 411. The time-distributed fully connected layer 705 may refer to a fully-connected layer of a feature synthesis machine learning model 405 that is configured to perform one or more prediction-based actions with respect to an input data object (e.g., a synthesis model sequence modeling output 714) and generate the hybrid-input prediction data object 411. An example of a time-distributed fully connected layer is the time-distributed Dense layer in the Keras application programming interface (API). The time-distributed fully connected layer may process an input data object (e.g., the synthesis model sequence modeling output 714) by extracting the most relevant feature for each time segment to generate a hybrid input prediction data object. The time-distributed fully connected layer 705 may be configured to determine the likelihood of one or more events based at least in part on the hybrid-input prediction data object. The time-distributed fully connected layer may be configured to determine a frequency or duration corresponding with the one or more events across one or more time intervals. The hybrid-input prediction data object 411 may refer to a data object that describes the output of the time-distributed fully connected layer 705 of the feature synthesis machine learning model 405. An example hybrid-input prediction data object 411 may comprise a single vector comprising a single relevant feature corresponding with each time segment.

FIG. 11 is a flowchart diagram illustrating an example process for generating a hybrid-input prediction data object 411 by a feature synthesis machine learning model 405. The process depicted in FIG. 11 begins at step/operation 1102, when the concatenation layer 701 of the feature synthesis machine learning model 405 processes the acceleration-based feature data object 406 and the audio-based feature data object 408 to generate a concatenation feature data object 712. At step/operation 1104, the synthesis model sequence modeling layer 703 of the feature synthesis machine learning model 405 processes the concatenated feature data object to generate a synthesis model sequence modeling output 714. Then at step/operation 1106, the time-distributed fully connected layer 705 processes the synthesis model sequence modeling output 714 to generate the hybrid-input prediction data object 411.

Performing Prediction-Based Actions

In various embodiments, the hybrid-input prediction system 101 may be configured to further perform or trigger prediction-based actions in response to generated predictive outputs (e.g., one or more generated hybrid-input prediction data objects 411). For example, the hybrid-input prediction system 101 may trigger generation (e.g., by a client computing entity 102) of user interface data (e.g., messages, data objects and/or the like) for presentation by a user computing entity.

FIG. 13 provides an example graphical representation 1300 illustrating an acceleration-based feature data object 406, an audio-based feature data object 408 and a hybrid-input prediction data object 411 generated by a hybrid-input prediction system 101. As shown, the acceleration-based feature data object 406 comprises a two-dimensional matrix having a length and a width in which a first dimension corresponds with a number of segments in time and a second dimension corresponds with a plurality of features associated with oscillations/vibrations occurring at the corresponding segments in time. The audio-based feature data object 408 comprises a two-dimensional matrix having a length and a width in which a first dimension corresponds with a number of segments in time and a second dimension corresponds with a plurality of features associated with frequencies of sound waves occurring at the corresponding segments in time. The hybrid-input prediction data object 411 comprises a single vector comprising a single relevant feature corresponding with each time segment. Each feature corresponds with a likelihood/probability of an event at the corresponding time segment. As shown, the hybrid-input prediction data object 411 indicates a very high likelihood of an event occurring at a single time segment ("1200"), based at least in part on the data/features contained in the acceleration-based feature data object 406 and the audio-based feature data object 408.

FIG. 14 provides an operational example showing user interface data generated based at least in part on an alert and/or corresponding predictive output (e.g., hybrid-input prediction data object 411). The predictive output may be provided (e.g., sent, transmitted and/or the like) to a client computing entity 102. The client computing entity 102 may generate a corresponding alert and provide (e.g., transmitted, sent and/or the like) corresponding user interface data for presentation by a user interface 1400. The user interface data may be used for dynamically updating a user interface 1400. In some embodiments, the user interface 1400 may dynamically update the display on a continuous or regular basis or in response to certain triggers. The user interface 1400 may comprise various features and functionality for accessing, and/or viewing user interface data. In one embodiment, the user interface 1400 may identify the user (e.g., monitored individual) credentialed for currently accessing the user interface 1400 (e.g., John Doe). The user interface 1400 may also comprise messages to the user in the form of banners, headers, notifications, and/or the like. As will be recognized, the described elements are provided for illustrative purposes and are not to be construed as limiting the dynamically updatable interface in any way.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for joint processing of an audio data object and an acceleration data object, the computer-implemented method comprising:

processing, by one or more computer processors, the audio data object using an audio processing machine learning model to generate an audio-based feature data object, wherein:
the audio processing machine learning model comprises: (i) an audio model fast Fourier transform (FFT) layer that is configured to process the audio data object in order to generate an audio model FFT output and (ii) an audio model one-dimensional convolutional layer that is configured to process the audio model FFT output to generate an audio model convolutional output, and
the audio-based feature data object is generated based at least in part on the audio model convolutional output;

processing, by the one or more computer processors, the acceleration data object using an acceleration processing machine learning model to generate an acceleration-based feature data object, wherein:
the acceleration processing machine learning model comprises: (i) an acceleration model FFT layer that is configured to process the acceleration data object to generate an acceleration model FFT output, (ii) an acceleration model one-dimensional convolutional layer that is configured to process the acceleration model FFT output to generate an acceleration model convolutional output, and (iii) an acceleration model up-sampling layer that is configured to process the acceleration model convolutional output to generate an acceleration model up-sampling output, and
the acceleration-based feature data object is generated based at least in part on the acceleration model up-sampling output;

processing, by the one or more computer processors, the audio-based feature data object and the acceleration-based feature data object using a feature synthesis machine learning model in order to generate a hybrid-input prediction data object; and performing, by the one or more computer processors, one or more prediction-based actions based at least in part on the hybrid-input prediction data object.

2. The computer-implemented method of claim 1, wherein:
the audio-based feature data object has an audio feature object target dimension length,
the acceleration-based feature data object has an acceleration feature object target dimension length, and
the audio feature object target dimension length and the acceleration feature object target dimension length are equal.

3. The computer-implemented method of claim 2, wherein the acceleration processing machine learning model comprises an acceleration model dimension adjustment layer configured to:
process the acceleration model up-sampling output by adjusting a target dimension of the acceleration model up-sampling output in accordance with the acceleration feature object target dimension in order to generate an acceleration model dimension adjustment output, and
generate the audio-based feature data object based at least in part on the acceleration model dimension adjustment output.

4. The computer-implemented method of claim 3, wherein the dimension adjustment layer comprises:
- an acceleration model sequence modeling layer that is configured to process the acceleration model up-sampling output to generate an acceleration model sequence modeling output,
- a second acceleration model up-sampling layer that is configured to process the acceleration model sequence modeling output to generate a second acceleration model up-sampling output, and
- an acceleration model dimension truncation layer that is configured to process the second acceleration model up-sampling output to generate the acceleration model dimension adjustment output.

5. The computer-implemented method of claim 1, wherein the feature synthesis machine learning model comprises:
- a concatenation layer that is configured to process the audio-based feature data object and the acceleration-based feature data object in order to generate a concatenated feature data object,
- one or more synthesis model sequence modeling layers that are collectively configured to process the concatenated feature data object in order to generate a synthesis model sequence modeling output, and
- a time-distributed fully connected layer that is configured to process the synthesis model sequence modeling output in order to generate the hybrid-input prediction data object.

6. The computer-implemented method of claim 1, wherein:
- the audio data object describes recorded audio data for a monitored individual, and
- the acceleration data object describes recorded cross-body acceleration data for the monitored individual.

7. The computer-implemented method of claim 6, wherein the hybrid-input prediction data object describes cough likelihoods for the monitored individual across one or more time intervals.

8. The computer-implemented method of claim 6, wherein the hybrid-input prediction data object describes cough frequency for the monitored individual across one or more time intervals.

9. The computer-implemented method of claim 6, wherein the hybrid-input prediction data object describes cough durations for the monitored individual across one or more time intervals.

10. An apparatus for joint processing of an audio data object and an acceleration data object, the apparatus comprising at least one processor and at least one memory including program code, the at least one memory and the program code configured to, with the processor, cause the apparatus to at least:
- process the audio data object using an audio processing machine learning model to generate an audio-based feature data object, wherein:
  - the audio processing machine learning model comprises: (i) an audio model fast Fourier transform (FFT) layer that is configured to process the audio data object in order to generate an audio model FFT output and (ii) an audio model one-dimensional convolutional layer that is configured to process the audio model FFT output to generate an audio model convolutional output, and
  - the audio-based feature data object is generated based at least in part on the audio model convolutional output;
- process the acceleration data object using an acceleration processing machine learning model to generate an acceleration-based feature data object, wherein:
  - the acceleration processing machine learning model comprises: (i) an acceleration model FFT layer that is configured to process the acceleration data object to generate an acceleration model FFT output, (ii) an acceleration model one-dimensional convolutional layer that is configured to process the acceleration model FFT output to generate an acceleration model convolutional output, and (iii) an acceleration model up-sampling layer that is configured to process the acceleration model convolutional output to generate an acceleration model up-sampling output, and
  - the acceleration-based feature data object is generated based at least in part on the acceleration model up-sampling output;
- process the audio-based feature data object and the acceleration-based feature data object using a feature synthesis machine learning model in order to generate a hybrid-input prediction data object; and
- perform one or more prediction-based actions based at least in part on the hybrid-input prediction data object.

11. The apparatus of claim 10, wherein:
- the audio-based feature data object has an audio feature object target dimension length,
- the acceleration-based feature data object has an acceleration feature object target dimension length, and
- the audio feature object target dimension length and the acceleration feature object target dimension length are equal.

12. The apparatus of claim 11, wherein the acceleration processing machine learning model comprises an acceleration model dimension adjustment layer, and the program code is further configured to, with the processor, cause the apparatus to at least:
- process the acceleration model up-sampling output by adjusting a target dimension of the acceleration model up-sampling output in accordance with the acceleration feature object target dimension in order to generate an acceleration model dimension adjustment output, and
- generate the audio-based feature data object based at least in part on the acceleration model dimension adjustment output.

13. The apparatus of claim 12, wherein the dimension adjustment layer comprises:
- an acceleration model sequence modeling layer that is configured to process the acceleration model up-sampling output to generate an acceleration model sequence modeling output,
- a second acceleration model up-sampling layer that is configured to process the acceleration model sequence modeling output to generate a second acceleration model up-sampling output, and
- an acceleration model dimension truncation layer that is configured to process the second acceleration model up-sampling output to generate the acceleration model dimension adjustment output.

14. The apparatus of claim 10, wherein the feature synthesis machine learning model comprises:
- a concatenation layer that is configured to process the audio-based feature data object and the acceleration-based feature data object in order to generate a concatenated feature data object,
- one or more synthesis model sequence modeling layers that are collectively configured to process the concatenated feature data object in order to generate a synthesis model sequence modeling output, and a time-distributed fully connected layer that is configured to process the synthesis model sequence modeling output in order to generate the hybrid-input prediction data object.

15. The apparatus of claim 10, wherein:
the audio data object describes recorded audio data for a monitored individual, and
the acceleration data object describes recorded cross-body acceleration data for the monitored individual.

16. A computer program product for joint processing of an audio data object and an acceleration data object, the computer program product comprising at least one non-transitory computer-readable storage medium having computer-readable program code portions stored therein, the computer-readable program code portions configured to:
process the audio data object using an audio processing machine learning model to generate an audio-based feature data object, wherein:
the audio processing machine learning model comprises: (i) an audio model fast Fourier transform (FFT) layer that is configured to process the audio data object in order to generate an audio model FFT output and (ii) an audio model one-dimensional convolutional layer that is configured to process the audio model FFT output to generate an audio model convolutional output, and
the audio-based feature data object is generated based at least in part on the audio model convolutional output;
process the acceleration data object using an acceleration processing machine learning model to generate an acceleration-based feature data object, wherein:
the acceleration processing machine learning model comprises: (i) an acceleration model FFT layer that is configured to process the acceleration data object to generate an acceleration model FFT output, (ii) an acceleration model one-dimensional convolutional layer that is configured to process the acceleration model FFT output to generate an acceleration model convolutional output, and (iii) an acceleration model up-sampling layer that is configured to process the acceleration model convolutional output to generate an acceleration model up-sampling output, and
the acceleration-based feature data object is generated based at least in part on the acceleration model up-sampling output;
process the audio-based feature data object and the acceleration-based feature data object using a feature synthesis machine learning model in order to generate a hybrid-input prediction data object; and
perform one or more prediction-based actions based at least in part on the hybrid-input prediction data object.

17. The computer program product of claim 16, wherein:
the audio-based feature data object has an audio feature object target dimension length,
the acceleration-based feature data object has an acceleration feature object target dimension length, and
the audio feature object target dimension length and the acceleration feature object target dimension length are equal.

18. The computer program product of claim 17, wherein the acceleration processing machine learning model comprises an acceleration model dimension adjustment layer, and the computer-readable program code portions are further configured to:
process the acceleration model up-sampling output by adjusting a target dimension of the acceleration model up-sampling output in accordance with the acceleration feature object target dimension in order to generate an acceleration model dimension adjustment output, and
generate the audio-based feature data object based at least in part on the acceleration model dimension adjustment output.

19. The computer program product of claim 18, wherein the dimension adjustment layer comprises:
an acceleration model sequence modeling layer that is configured to process the acceleration model up-sampling output to generate an acceleration model sequence modeling output,
a second acceleration model up-sampling layer that is configured to process the acceleration model sequence modeling output to generate a second acceleration model up-sampling output, and
an acceleration model dimension truncation layer that is configured to process the second acceleration model up-sampling output to generate the acceleration model dimension adjustment output.

20. The computer program product of claim 16, wherein the feature synthesis machine learning model comprises:
a concatenation layer that is configured to process the audio-based feature data object and the acceleration-based feature data object in order to generate a concatenated feature data object,
one or more synthesis model sequence modeling layers that are collectively configured to process the concatenated feature data object in order to generate a synthesis model sequence modeling output, and
a time-distributed fully connected layer that is configured to process the synthesis model sequence modeling output in order to generate the hybrid-input prediction data object.

* * * * *